(12) United States Patent
Roths et al.

(10) Patent No.: US 11,343,077 B1
(45) Date of Patent: *May 24, 2022

(54) NETWORK ACCESS CONTROL

(71) Applicant: Amazon Technologies, Inc., Seattle, WA (US)

(72) Inventors: Andrew Jay Roths, Kenmore, WA (US); Marc Solsona-Palomar, Bellevue, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 150 days.

This patent is subject to a terminal disclaimer.

(21) Appl. No.: 16/836,600

(22) Filed: Mar. 31, 2020

Related U.S. Application Data

(63) Continuation of application No. 16/296,681, filed on Mar. 8, 2019, now Pat. No. 10,644,880, which is a
(Continued)

(51) Int. Cl.
*H04L 29/06* (2006.01)
*H04L 9/08* (2006.01)
(Continued)

(52) U.S. Cl.
CPC ........... *H04L 9/0819* (2013.01); *H04L 9/083* (2013.01); *H04L 9/0833* (2013.01);
(Continued)

(58) Field of Classification Search
None
See application file for complete search history.

(56) References Cited

U.S. PATENT DOCUMENTS 5,728,489 A 3/1998 Gao et al.
8,533,803 B2 9/2013 Cha et al.
(Continued)

OTHER PUBLICATIONS

Martikainen, Henrik et al. Impact of portable device restrictions on IEEE 802.16 performance. Portable-Polytronic 2008—2nd IEEE International Interdisciplinary Conference on Portable Information Devices. https://ieeexplore.ieee.org/stamp/stamp.jsp?tp=&arnumber=4681273 (Year: 2008).*

(Continued)

*Primary Examiner* — Jeremiah L Avery
(74) *Attorney, Agent, or Firm* — Eversheds Sutherland (US) LLP

(57) ABSTRACT

This disclosure describes methods, apparatus, and systems related to controlled access data allocation. A device may receive a first request from a first device to establish a first connection with a wireless network. The device may receive a second request from a second device to establish a second connection with the wireless network. The device may determine a first access data for the first device, wherein the first access data is associated with a first access configuration. The device may determine a second access data for the second device, wherein the second access data is associated with a second access configuration, wherein the second access configuration is different from the first access configuration. The device may send the first access data to the first device. The device may send the second access data to the second device. The device may establish the first connection with the first device, wherein the first connection is at the first access configuration. The device may establish the second connection with the second device, wherein the second connection is at the second access configuration.

21 Claims, 9 Drawing Sheets

Related U.S. Application Data continuation of application No. 15/079,989, filed on Mar. 24, 2016, now Pat. No. 10,230,522.

(51) Int. Cl.
| | |
|---|---|
| *H04L 67/12* | (2022.01) |
| *H04W 76/10* | (2018.01) |
| *H04L 9/32* | (2006.01) |
| *H04W 12/04* | (2021.01) |
| *H04W 12/043* | (2021.01) |
| *H04W 12/50* | (2021.01) |
| *H04W 12/60* | (2021.01) |
| *H04W 12/61* | (2021.01) |
| *H04W 12/069* | (2021.01) |

(52) U.S. Cl.
CPC ............ *H04L 9/3226* (2013.01); *H04L 67/12* (2013.01); *H04W 12/04* (2013.01); *H04W 12/043* (2021.01); *H04W 12/069* (2021.01); *H04W 12/50* (2021.01); *H04W 12/60* (2021.01); *H04W 12/61* (2021.01); *H04W 76/10* (2018.02); *H04L 2209/805* (2013.01)

(56) References Cited

U.S. PATENT DOCUMENTS

| | | | | |
|---|---|---|---|---|
| 8,539,567 | B1* | 9/2013 | Logue | ................ H04L 63/0428 726/7 |
| 8,635,373 | B1* | 1/2014 | Supramaniam | ......... H04L 63/08 709/248 |
| 8,949,968 | B2 | 2/2015 | Wei et al. | |
| 9,009,805 | B1* | 4/2015 | Kirkby | ............. G08B 13/19684 726/7 |
| 10,230,522 | B1 | 3/2019 | Roths et al. | |
| 10,484,770 | B1 | 11/2019 | Rao et al. | |
| 10,644,880 | B1 | 5/2020 | Roths et al. | |
| 10,924,834 | B1 | 2/2021 | Rao et al. | |
| 2002/0135294 | A1 | 9/2002 | Fijishiro et al. | |
| 2003/0125959 | A1 | 7/2003 | Palmquist | |
| 2004/0103153 | A1* | 5/2004 | Chang | ..................... H04L 43/00 709/206 |
| 2006/0044746 | A1 | 3/2006 | Kim et al. | |
| 2006/0277049 | A1 | 12/2006 | Huang | |
| 2008/0254278 | A1 | 10/2008 | Sethumadhavan | |
| 2008/0263363 | A1 | 10/2008 | Jueneman et al. | |
| 2009/0041283 | A1 | 2/2009 | Ishibashi et al. | |
| 2009/0055514 | A1 | 2/2009 | Tebbs et al. | |
| 2009/0254750 | A1 | 10/2009 | Bono et al. | |
| 2009/0274333 | A1 | 11/2009 | Lan et al. | |
| 2009/0316056 | A1 | 12/2009 | Rosencwaig et al. | |
| 2010/0246877 | A1 | 9/2010 | Wang et al. | |
| 2011/0001706 | A1 | 1/2011 | Sanford et al. | |
| 2012/0224299 | A1 | 9/2012 | Myers et al. | |
| 2012/0264443 | A1* | 10/2012 | Ng | ......................... H04W 4/70 455/450 |
| 2012/0300969 | A1 | 11/2012 | Tanaka et al. | |
| 2013/0048837 | A1 | 2/2013 | Pope et al. | |
| 2013/0227291 | A1* | 8/2013 | Ahmed | ............... H04L 63/0884 713/171 |
| 2014/0241551 | A1 | 8/2014 | Kirn et al. | |
| 2014/0272561 | A1 | 9/2014 | Huang et al. | |
| 2014/0341417 | A1 | 11/2014 | McGarry et al. | |
| 2015/0053497 | A1 | 2/2015 | Horiuchi | |
| 2015/0092334 | A1 | 4/2015 | Hayashida et al. | |
| 2015/0188949 | A1 | 7/2015 | Mahaffey et al. | |
| 2015/0195635 | A1 | 7/2015 | Garfio et al. | |
| 2015/0318998 | A1* | 11/2015 | Erlikhman | ............ H04L 9/0863 713/171 |
| 2016/0197352 | A1 | 7/2016 | Blaser et al. | |
| 2016/0264443 | A1 | 9/2016 | Matsumoto et al. | |
| 2016/0345086 | A1 | 11/2016 | Chamberlin et al. | |
| 2017/0242478 | A1 | 8/2017 | Ma | |
| 2018/0084323 | A1 | 3/2018 | Luce et al. | |
| 2018/0174584 | A1 | 6/2018 | Chih et al. | |
| 2018/0219976 | A1 | 8/2018 | Decenzo et al. | |
| 2019/0069078 | A1 | 2/2019 | Johnson et al. | |
| 2019/0165430 | A1 | 5/2019 | Maresh et al. | |
| 2019/0173125 | A1 | 6/2019 | Lanning et al. | |
| 2019/0267628 | A1 | 8/2019 | Yadav | |
| 2020/0083509 | A1 | 3/2020 | Hermann et al. | |

OTHER PUBLICATIONS

Ansari, Junaid et al. Spectrum Agile Medium Access Control Protocol for Wireless Sensor Networks. 2010 7th Annual IEEE Communications Society Conference on Sensor, Mesh and Ad Hoc Communications and Networks (SECON). https://ieeexplore.ieee.org/stamp/stamp.jsp?tp=&arnumber=5508296 (Year: 2010).*

Kbar, Ghassan. Wireless network token-based fast authentication. 2010 17th International Conference on Telecommunications. https://ieeexplore.ieee.org/stamp/stamp.jsp?tp=&arnumber=5478863 (Year: 2010).*

Wirtz Hanno et al. CA-Fi; Ubiquitous Mobile wireless without 802.11 Overhead and Restrictions 2014 Proceeding of IEEE (year 2014); 9 pgs.

Korba, Larry Security System for Wireless local area networks. Ninth IEEE (1998); 8 pgs.

Antonious, Josephina et al. Cooperation among Access Points for Enhances Quality of Service in Dense Wireless Environments. 2014 Proceeding of IEEE International Symposium on a World of Wireless, Mobile and Multimedia Networks. https://ieeexplore.ieee.org/stamp/stamp.jsp?tp=&arnumber=6918953 (Year 2014); 6 pgs.

Fremantle, Paul et al. Federated Identity and Access Management for the Internet of Things. 2014 International Workshop on Secure Internet of Things. https://ieeexplore.ieee.org/stamp/stamp.jsp?tp=&arnumber=7058903 (Year 2014); 8 pgs.

Datta, Soumya Kanti, Towards Security Discovery Services in Internet of Things. 2016 IEEE International Conference on Consumer Electronic (ICCE). https://ieeexpiore.ieee.org/stamp/stamp.jsp?tp=&arnumber=7430707 (Year 2016); 2 pgs.

Zafari, Faheem et al. Microlocation for Internet-of-Things-Equipped Smart Buildings. IEEE Internet of Things Journal, vol. 3, Issue: 1. https://ieeexplore,org/stamp/stamp.jsp?tp=&arnumber=7120085 (Year 2016); 17 pgs.

* cited by examiner

NETWORK ACCESS CONTROL

CROSS-REFERENCE TO RELATED APPLICATIONS

This application is a continuation of U.S. patent application Ser. No. 16/296,681, filed Mar. 8, 2019, which is a continuation of U.S. patent application Ser. No. 15/079,989, filed Mar. 24, 2016, the entire disclosures of which are hereby incorporated by reference.

BACKGROUND

Wireless devices are becoming widely prevalent and are increasingly requesting access to networks, such as Wi-Fi networks. Wi-Fi networks may be established within a household, a business or a public environment, or any combination thereof. Many Wi-Fi networks use technologies compliant with one or more of the Institute of Electrical and Electronics Engineers (IEEE) 802.11 standards. A Wi-Fi network may include multiple devices connected together, such as an access point, and one or more client devices including laptops, mobile device, and Internet of Things (IoT) devices.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
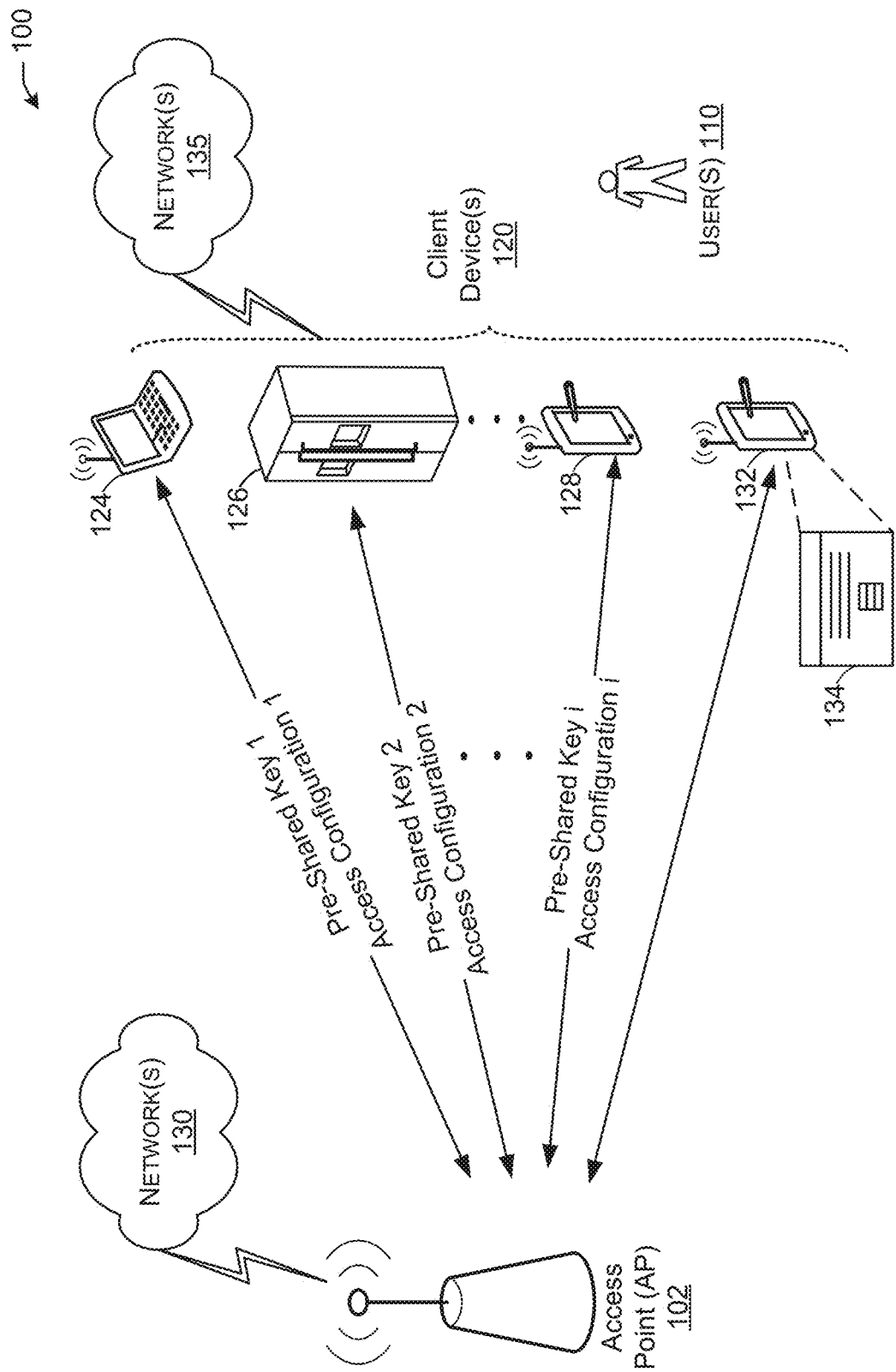
FIG. 1 depicts a network diagram illustrating an example network environment of a controlled Pre-Shared Key (PSK) allocation, according to one or more example embodiments of the disclosure.

Example embodiments described herein provide certain systems, methods, and devices, for facilitating a controlled use of access data, such as, a plurality of pre-shared keys (PSKs) to provide a secure Wi-Fi connection to client devices within a Wi-Fi protected access (WPA) or WPA release 2 (WPA2) environments.

The IEEE 802.11 family of standards incorporates security features, such as, Wired Equivalent Privacy (WEP), Wi-Fi Protected Access (WPA), and WPA2. WEP was the original 802.11 pre-shared key mechanism. WPA and WPA2 use stronger encryption than WEP and are based on the IEEE 802.11i ratified amendment. WPA and WPA2 allow for security authentication using a PSK. A PSK is a secret that may be shared between two devices using a secure channel. The PSK is type of access data used to access another device and/or service. In use, an access point (AP) authenticates a client device by utilizing access data (e.g., a PSK) to generate a unique encryption key, which may be utilized by the client device and the AP to send and receive encrypted data over the Wi-Fi network. Access data may be data that is shared between multiple devices in order to allow one device to access another. For example, using access data in the form an alphanumeric sequence, a first device may share that access data with a second device. The second device may then send the alphanumeric sequence to the first device in an attempt to access the first device. The first device may then verify that the alphanumeric sequence provided by the second device is what was shared by the first device.

Some examples of client devices may include desktops, laptops, mobile device, wearable devices, Internet of Things (IoT) devices, etc. IoT devices may include, but not limited to, devices, house appliances, vehicles, and other items embedded with electronics, software, sensors, and network connectivity. IoT devices may be able to collect and exchange data with other devices and can be sensed and controlled remotely across existing network infrastructure. In a household Wi-Fi infrastructure, all client devices share the same PSK. The PSK may be obtained from an administrator of the Wi-Fi network or may be provisioned in the AP during initial deployment at the household. Once the client device acquires the PSK, the client device may generate an encryption key using the PSK to send and receive data with the AP. However, the same PSK is given by the AP to all client devices requesting access to the Wi-Fi AP.

Sharing a single PSK among multiple client devices within a Wi-Fi network may result in security risks. When a client device attempts to connect to an AP, the client device may provide the PSK to the AP to be authenticated and to establish a Wi-Fi connection to the AP. Providing the PSK matches the AP's provisioned PSK, the client may a Wi-Fi connection to the AP. However, if a client device is compromised, such that an unauthorized user gains access to the PSK, then all client devices and the Wi-Fi network may be exposed for hacking. In order to re-secure the Wi-Fi network requires provisioning a new PSK for all client devices that are serviced by the AP. This may be a time consuming and difficult experience, especially for mobile and IoT client devices.

There are many ways that a PSK may be compromised. For example, a person previously granted access (such as a houseguest) may lose their computer, have their computer hacked, or willingly share the PSK with others. In another example, an IoT device may be disposed of (e.g., thrown in the garbage) without properly erasing the PSK. The A perpetrator may later extract the PSK using a variety of technical means. A further example may be a device (e.g., an IoT device or any other device) on the network that may be hacked and the PSK extracted from it. Finally, a network may be vulnerable for having a weak PSK that may be hacked during the authentication process of WPA/WPA2. For example, a hacker located within range of a home Wi-Fi network may monitor the home's Wi-Fi traffic to acquire the PSK using hacking software. Once the hacker obtains the PSK, the hacker may gain access to the home Wi-Fi network. The hacker may be able to take control of the home's Wi-Fi router. Further, the hacker may then change the domain name system (DNS) settings so the Internet traffic from the Wi-Fi network is relayed through the hacker's machine or system.

Another issue with an AP using a single PSK is restricting what client devices are allowed to access on the Wi-Fi network. For instance, it may be desired to prevent a guest from accessing a certain file server, limit the times when a child's tablet is allowed access to the network, limit an IoT device to communicate only with internet, etc. Using a single PSK, requires adding restrictions based on a media access control (MAC) address because the MAC address may be the only differentiating factor between devices. However, many public techniques and tools may be used to capture and alter a device's MAC address resulting in a potential security exposure.

Example embodiments of the present disclosure relate to systems, methods, and devices for controlled PSK allocation in a Wi-Fi network. The AP may perform steps to determine whether a client device is allowed to establish a Wi-Fi connection to the AP. The AP may be configured to provision PSKs on a per client device or per group of client devices basis. The AP may assign a particular PSK to a client device in order to enable the client device to connect to the Wi-Fi network through the AP. Additionally/alternatively, the AP may communicate with an administration device in order to assign a particular PSK to the client device. For example, in a home Wi-Fi infrastructure associated with an AP, a client device, such as a mobile device, tablet, IoT device, desktop computer, or any other computing device, may initiate and establish a Wi-Fi connection in the home Wi-Fi infrastructure after it has been approved to access the Wi-Fi network. The client device may be required to provide a PSK so that the AP and the client device may establish a secure connection for the Wi-Fi connection. The client device may request the PSK from the AP and/or an administrator. The request may contain information associated with the client device. Some of the information may include the media access control (MAC) address of the client device, the type of client device, etc. The AP may assign a first PSK to the client device based partly on the information received from the client device and based on an access configuration to be enforced when establishing the Wi-Fi connection. The access configuration may be associated with a scope of access to the Wi-Fi network through the Wi-Fi connection. If a second client device requests a Wi-Fi connection to the AP, a second PSK may be assigned to the second client device such that the second PSK is different from the first PSK. Further, the access configurations given to the first PSK and the second PSK may be different based on the client devices.

In an illustrative example, when a mobile device enters the coverage of a Wi-Fi network associated with an AP, the mobile device may request a PSK from the AP or from the administrator of the Wi-Fi network. If the request is made to the AP, then the AP may determine whether to assign a PSK to the mobile device, queue the request for later approval by the administrator, notify an administration device of the request, or reject the request for PSK. When it is determined to assign a PSK to the mobile device, the AP and/or the administrator may assign the PSK, and in some embodiments, the PSK may be associated with a certain network access configuration. The PSK may be assigned and shared with a client device or a group of client devices. In one or more embodiments, a PSK may be randomly generated by the AP, it may be determined by the administrator, or may be initially provisioned in the AP. For example, when the AP receives the access request from the mobile device, the AP may also receive device information associated with the mobile device requesting access. Device information may include at least in part, the service set identifier (SSID) of the network, the MAC address of the client device, one or more parameters associated with the request (e.g., time, signal strength, past requests, device type, location, etc.).

The AP may determine, based on the device information what access configuration and which PSK to sign for that client device. For example, when the AP determines the access configuration, the AP may randomly generate a PSK and may assign that PSK with the access configuration to the client device. In another example, the administrator may provision a specific PSK to be assigned to the mobile device, where the PSK may be associated with an access configuration to the Wi-Fi network. The access configuration may be for example, limiting which devices on the network the mobile device may access. In another example, the PSK may be associated with an access configuration that restricts access to the Wi-Fi network to two hours after connecting to the Wi-Fi network. The PSK may then be provided/sent to the mobile device by the AP or by the administrator. The mobile device may then provide the PSK when prompted for an access key while attempting to establish the Wi-Fi connection. If the mobile device enters the correct PSK, the mobile device may be authenticated and the mobile device may be provided with an encryption key that is based, at least in part, on the assigned PSK. After authentication, the mobile device may use the encryption key to send and receive data within the constraints of the assigned access configuration associated with the PSK.

In another example, such as, a hotel environment, a user may establish a Wi-Fi connection by first accessing a captive portal. It is understood that a captive portal is a webpage that the user of a public-access network is obliged to view and interact with before access is granted. Captive portals are typically used by business centers, airports, hotel lobbies, coffee shops, and other venues that offer free Wi-Fi hot spots for Internet users. In one embodiment, the captive portal may be adapted in one or more embodiments of the disclosure to allow for a controlled PSK allocation. For example, in a captive portal scenario (e.g., at a hotel), a parent may access the captive portal webpage using credentials provided by the hotel. The captive portal may be configured to facilitate access to a controlled PSK allocation system such that the parent may be able to manage the Wi-Fi access of one or more client devices that are associated with the guest account of the parent or other family members and/or guests of the hotel room. For example, the parent may be able to an assign access configuration associated with a PSK to one or more Wi-Fi connections of client devices. For example, a daughter of the parent may request a Wi-Fi connection using her tablet. The parent may be able to assign a PSK to the daughter's tablet. The parent may select an access configuration appropriate to the daughter's tablet that may be associated with the assigned PSK. For example, the parent may have determined that the daughter's tablet should not be provided access to the Internet past 9 PM each night at the hotel. Therefore, the parent may assign an access configuration that restricts the daughter's tablet from accessing the Internet past 9 PM and revoke her tablet's internet access passed 9 PM each night at the hotel. The parent may be able to assign a second PSK with a different access configuration to a connected device to which only the parent has access. The parent may assign a specific PSK associated with that access configuration using the captive portal and the controlled PSK allocation system.

In some embodiments, a controlled PSK allocation system may provide a management interface for provisioning an AP with two or more PSKs to be associated with one or more client devices. For example, the management interface may be associated with an application running on an administration device and/or a website accessible by an administrator of the AP from the administration device. The application and/or website may provide one or more user interface and control features that may be maintained by the AP. The one or more user interface and/or control features may include features to display a list of client devices that may be authorized to establish a Wi-Fi connection along with any restrictions or scope of access (e.g., access configuration) that may have been applied to the client devices. Further, the one or more display and/or control features may provide a log of activities performed by these client devices. Even further, the one or more user interface and/or control features may also maintain a calendar that shows these activities. The application and/or webpage may also facilitate assigning access restrictions, temporarily disabling access, or modifying access configurations.

In some embodiments, a controlled PSK allocation system may provide the end user with easy controls for access restrictions/limits. Restrictions may include, at least in part, time of day access restrictions, automatic revocation on a certain data after a certain amount of time, bandwidth limits, relative priority compared to other machines on the network, access to other machines on the network, access to the internet, parental control site restrictions. Automatic revocation can be made robust against power outages or crashes, by adding a check when a client reconnects to a network. For example, if an administrator revokes access to a mobile device and later a power outage occurs, when the mobile device reconnects to the network using the previously assigned PSK, the controlled PSK allocation system may check previous revocation and modifications to the access configuration assigned to the mobile device.

In some embodiments, the controlled PSK allocation system may facilitate enabling Wi-Fi Protected Setup (WPS) for a predetermined period on the AP. It should be noted that WPS is provided as an example only and that other security mechanisms may be employed to send and receive a PSK. The AP may accept requests for access from client devices within the predetermined period. However, the AP may not immediately provide the client device with a specific PSK. Instead, the request for PSK may be placed in a pending state. The administrator may access one or more user interfaces accessed through an application running on an administration device and/or may be accessed through a webpage in order to approve or deny the pending requests. The administrator may enter login credentials to access the webpage from an administration device or execute an application on the administration device in order to establish communication with the AP. After the administrator is authenticated with the web server hosting the webpage or after executing the application on the administration device, the AP and the web server (or the application) may communicate to send and receive message based at least in part on inputs from the administrator using the administration device. The webpage or the application running on the administration device may display one or more user interfaces allowing the administrator to select access restrictions to be associated with a specific PSK that may be assigned for that client device. For example, a client device, such as a laptop, having WPS enabled may request a Wi-Fi connection associated with an AP having WPS enabled. The request may be stored on a memory device of the AP such that an administrator of the AP may determine whether to allow or deny the request. However, in some instances, the laptop, or any other WPS enabled device, may timeout before receiving a response to the request. In that case, the administrator may continue to determine the access configuration associated with the laptop, approve the access request, and assign a specific PSK to be used by the laptop. The client device may retry the access using WPS by sending a second request, by which point the administrator may have determined the specific PSK to be assigned to that laptop. The AP may determine that the laptop has been approved but did not retrieve the PSK yet. Consequently, the AP may provide the laptop with the PSK in response to the second request message. In some embodiments, the application running on the administration device and/or the webpage may maintain whether a request is a new request, and approved request, or a repeated request. This may provide a layer of security in order to determine whether an attack is ensuing. For example, if there are multiple repeated requests, it may be determined that a hacking attack is occurring and additional actions may be taken to stop the attacks. Additional actions may include blocking certain traffic on the AP, re-provisioning the AP, assigning new PSKs, etc.

In some embodiments, some client devices may not support WPS (or other security mechanisms) and/or the administrator may not be in favor of enabling WPS because of WPS' security risks. In either scenario, the controlled PSK allocation system may generate a new PSK that may be shorter than 64 bytes. Being a shorter PSK may be less complex and easier to share with client devices. Further, a shorter PSK may be easier to type by a user of the client device when establishing a Wi-Fi connection. The administrator may continue to associate the new PSK with one or more access restrictions based at least in part on the client device requesting access. For example, an IoT device without WPS support may be assigned a short PSK that is shorter than 64 bytes in size. It should be understood that although a short PSK is assigned, it may be possible to assign a long PSK or any PSK. The short PSK may be associated with restrictions, such as limiting the data bandwidth that may be used by the IoT device. The delivery of the short PSK to devices that do not have WPS enabled may be accomplished through a number of mechanisms. The mechanisms may include delivery through a cellular network, Wi-Fi network, near field communication (NFC), Bluetooth, short message service (SMS), instant messaging (IM), supersonic signals, subsonic signals, non-voice audio signals, voice commands, or any other mechanism for data communication. Continuing with the example of the IoT device, the AP may deliver the new PSK to the IoT device using Bluetooth. The IoT device may then utilize the short PSK in order to establish a Wi-Fi connection.

In one embodiment, the PSK may be allowed for any MAC address initially, but may be restricted after its first use to the first MAC address that first uses it. That is, when the PSK was first assigned to the client device, the client device may not have taken a consideration to which device MAC address requested the PSK, but further when a client device utilizes that PSK to login to establish a Wi-Fi connection, the PSK may be restricted to the MAC address of that client device. In that case, the PSK will be only assigned to that client device and would not be assigned to other devices. Doing so, may prevent the PSK from being shared or inadvertently used at various places.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, according to some example embodiments of the present disclosure. Wireless network 100 may include one or more client device(s) 120 and one or more access point(s) (AP) 102, which may communicate in accordance with IEEE 802.11 communication standards. The AP 102 and/or the client device(s) 120 may be fixed location devices or may be mobile devices that do not have fixed locations. Client device(s) 120 may include an administration device 132 that may be utilized by an administrator of the network. The administration device 132 may access a user interface 134 using an application running on the administration device 132 and/or accessing a webpage from the administration device 132.

Figure 7:
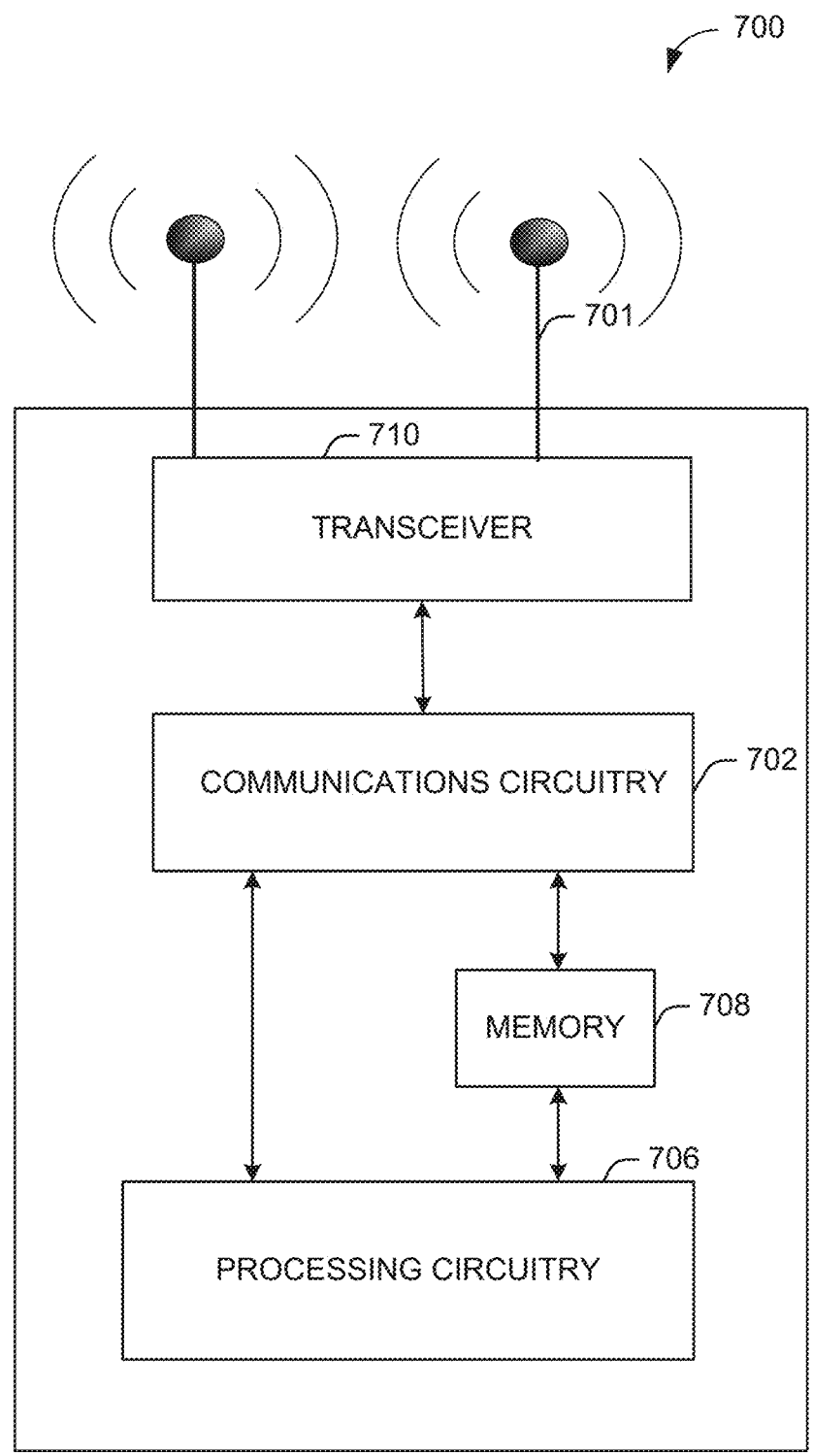
FIG. 7 illustrates a functional diagram of an example communication station that may be suitable for use as a client device, in accordance with one or more example embodiments of the disclosure.
Figure 8:
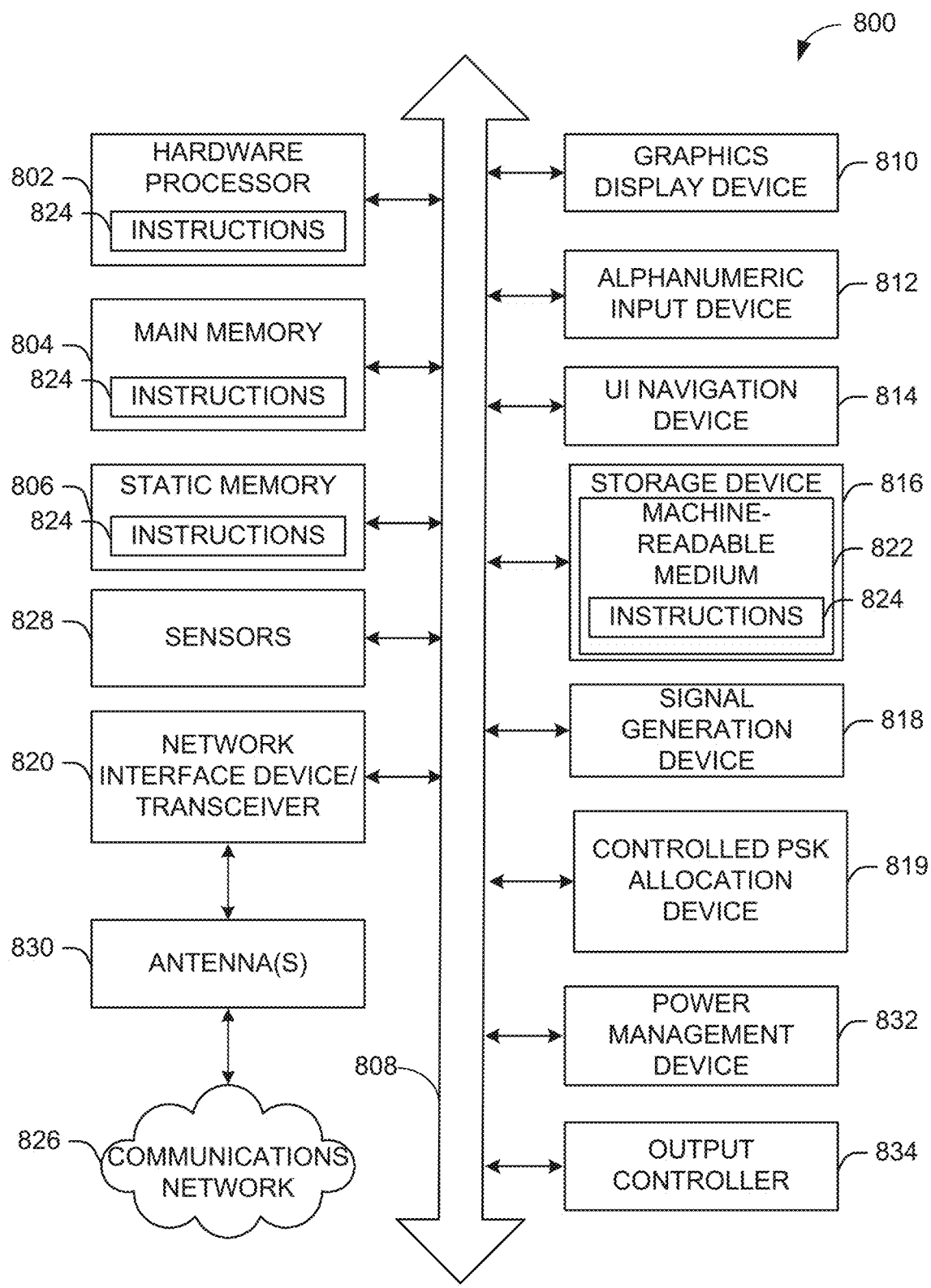
FIG. 8 is a block diagram of an example machine upon which any of one or more techniques (e.g., methods) may be performed, in accordance with one or more embodiments of the disclosure.

In some embodiments, the client device(s) 120 and AP 102 may include one or more computer systems similar to that of the functional diagram of FIG. 7 and/or the example machine/system of FIG. 8.

One or more illustrative client device(s) 120 may be operable by one or more user(s) 110. The client device(s) 120 (e.g., devices 124, 126, 128, or 132) may include any suitable processor-driven client device including, but not limited to, a desktop client device, a laptop client device, a server, a router, a switch, an access point, a smartphone, a tablet, an IoT device, wearable wireless device (e.g., bracelet, watch, glasses, ring, etc.) and so forth. IoT devices may include devices, such as, refrigerators, vehicles, buildings, and other items, which are embedded with networking capability. Network connectivity enables IoT devices to collect and exchange data. IoT devices may be accessed and controlled remotely across existing network infrastructure. The term IoT is used to refer to any device (e.g., an appliance, a sensor, a house appliance, a vehicle, etc.) that may include a network interface associated with one or more network protocols, such as, Wi-Fi, Bluetooth, NFC, etc. An IoT device may transmit information to one or more other devices over a wired or wireless connection. An IoT device may also include a quick response (QR) code, a radio-frequency identification (RFID) tag, an NFC tag, etc. The IoT device may also include, but not limited to, a radio circuitry, such as a transceiver that may operate at various modulation techniques, such, on-off keying (OOK), such as, amplitude shift keying (ASK) or frequency shift keying (FSK), or the like. Some example of IoT devices my include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc. IoT devices may also include cell phones, desktop computers, laptop computers, tablet computers, personal digital assistants (PDAs), etc. Accordingly, the IoT network may be comprised of a combination of legacy Internet-accessible devices (e.g., laptop or desktop computers, cell phones, etc.) in addition to devices that do not typically have Internet-connectivity (e.g., dishwashers, etc.).

Any of the client device(s) 120 (e.g., devices 124, 126, 128, and 132), and AP 102 may be configured to communicate with each other via one or more communications network(s) 130 and/or 135 wirelessly or wired. Any of the communications network(s) 130 and/or 135 may include, but not limited to, any one of a combination of different types of suitable communications networks such as, for example, broadcasting networks, cable networks, public networks (e.g., the Internet), private networks, wireless networks, cellular networks, Wi-Fi networks, or any other suitable private and/or public networks. Further, any of the communications network(s) 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications network(s) 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the client device(s) 120 (e.g., devices 124, 126, 128, and 132), and AP 102 may include one or more communications antennae. Communications antenna may be any suitable type of antenna corresponding to the communications protocols used by the client device(s) 120 (e.g., devices 124, 126, 128, and 132), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the client device(s) 120.

Any of the client device(s) 120 (e.g., devices 124, 126, 128, and 132), and AP 102 may include any suitable radio and/or transceiver for transmitting and/or receiving radio frequency (RF) signals in the bandwidth and/or channels corresponding to the communications protocols utilized by any of the client device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When setting up a wireless LAN for a Wi-Fi infrastructure, an initial task is to configure the AP that may be used to operate in the Wi-Fi infrastructure. In one embodiment, an administrator may configure the AP with access data, for example, one or more PSKs or may assign a PSK to a client device or a group of client devices after a request to establish a Wi-Fi connection is received. Access data may be data that is shared between multiple devices in order to allow one device to access another. For example, using access data in the form an alphanumeric sequence, a first device may share that access data with a second device. A PSK may be a type of access data. The PSK may be a passphrase that may be assigned and shared with a client device or a group of client devices. In one or more embodiments, a PSK may be randomly generated by the AP, it may be determined by the administrator, or may be initially provisioned in the AP. For example, an IoT device, such as a thermostat, a fridge, or any other IoT device, may first request a Wi-Fi connection associated with the AP. The request may be to acquire a PSK for authentication/authorization of the IoT device before establishing a Wi-Fi connection. The PSK may be one of a plurality of PSKs that may be assigned by an administrator. The PSK may be shared with the IoT device through various means. The PSK may be shared with a client device 120 by the AP after the PSK has been provisioned on the AP, or may be provided by the administrator through an administration device. For example, an IoT device may receive the PSK from the administration device through Bluetooth, or other communication mechanisms.

The initial authentication process is carried out by using the assigned PSK. This process ensures that the client device is authenticated with the AP. The client device may perform the authentication procedure using the WPA/WPA2 four-way handshake mechanism in accordance with IEEE 802.11. Using the PSK, a pairwise master key (PMK) may be derived on both the AP and the client device requesting a Wi-Fi connection. Instead of disclosing the key, the AP and the client device may encrypt messages to each other, which can only be decrypted by using the PMK that the AP and the client device share.

A four-way handshake is used to establish another key called the Pairwise Transient Key (PTK). The PTK is generated by concatenating one more parameters that may be shared between the AP and the client device. Some of these parameters may be the PMK, AP nonce (ANonce), STA nonce (SNonce), AP MAC address, and STA MAC address. The four-way handshake may also yields another key known as the GTK (Group Temporal Key), which is used to decrypt multicast and broadcast traffic. The four-way handshake is designed so that the AP and the client device can independently prove to each other that they know the PSK/PMK, without disclosing the PSK or the PMK.

In general, Wi-Fi Protected Setup (WPS) is a network security standard that allows users to connect wireless client devices (tablets, smart phones, etc.) to the AP without accessing the router configuration screens, and without having to enter the PSK at the wireless client device. To connect using WPS, both the AP and wireless client devices must support WPS. An AP that supports WPS contains a button that may be pressed by a user in order to give access to a WPS enabled wireless client device or a WPS personal identification number (PIN) may be entered on the wireless client device. The WPS button is either a button on the AP or an option on the AP's user interface. It should be noted that WPS is provided as an example only and that other security mechanisms may be employed to send and receive a PSK.

Typically, both the AP and the wireless client device trigger WPS from their respective interfaces in order to start the WPS wireless connection. Another way to connect a wireless client device to an AP using WPS is to use a PIN. The PIN may be available on the AP and entered on the wireless client device when the client device wants to connect to the AP. The PIN may be simpler or easier to remember password than the PSK. At that point, the AP securely transmits the PSK to the wireless client device. Although this may be simpler to implement, it does present security vulnerabilities. For example, the PIN may be easier to crack as opposed to the actual PSK. Having the PIN may allow an attacker to obtain the PSK, which in return results in access to Wi-Fi network and the devices present on the Wi-Fi network.

In one embodiment, and with reference to FIG. 1, the AP 102 may be configured to assign one or more PSKs that may be used to authenticate and/or authorize one or more client device(s) 120 to establish a Wi-Fi connection with the AP. The AP 102 may service one or more client device(s) 120 (e.g., devices 124, 126, 128, and 132) within a Wi-Fi infrastructure. The Wi-Fi infrastructure may contain one or more Wi-Fi networks that are maintained by the AP 102. In order for any or all of the client device(s) 120 to establish a Wi-Fi connection (e.g., for the first time) maintained by the AP 102, a client device 120 may request a Wi-Fi connection with the AP 102. The AP 102 may allocate and/or assign one of the plurality of PSKs to a client device 120.

In some examples, an administrator of the Wi-Fi infrastructure may provision the AP 102 with a plurality of PSKs that may be utilized for authenticating and/or authorizing the client device(s) 120 to establish a Wi-Fi connection. The administrator may associate a specific client device 120 with a specific PSK. In this scenario, the administrator may log into the AP 102, using an application or accessing a webpage from administration device 132 in order to perform the AP 102 provisioning. It is understood that the administrator may run one or more applications on the AP 102 and/or on the administration device 132 in order to launch one or more user interfaces 134 in accordance with one or more embodiments of the disclosure. It is also understood that the webpage may be hosted by a cloud service or by a domain on the Internet. These are not to be considered as limitations, but instead are presented here as exemplary illustrations.

In another embodiment, a client device 120 may request a PSK from the AP 102 and/or from an administration device 132. For example, the client device 126 may request a PSK from the AP 102 in order to be authenticated/authorized to establish a Wi-Fi connection. The AP 102 may determine whether to allocate a PSK to the client device 126, queue the request, notify the administrator of the request, reject the request for PSK from the client device 126, or allocate one or more restrictions to be associated with the client device 126.

In one embodiment, the client device(s) 120 may acquire respective PSKs by requesting a Wi-Fi connection using WPS. WPS must be supported and enabled on the AP 102 and on any client device 120 (e.g., client devices 124 and 126) requesting access using WPS. WPS may be enabled on the AP 102, for example, by an administration device 132 (e.g., using an application or accessing a webpage), or by an administrator, so that client devices 124 and 126 may request a Wi-Fi connection using WPS. It should be noted that WPS is provided as an example only and that other security mechanisms may be employed to send and receive a PSK. In one embodiment, the AP 102 and/or the administration device 132 may not immediately provide the client devices 124 and 126 with PSK 1 or PSK 2, respectively. The AP 102 may queue the requests from client devices 124 and 126 and may place the requests in a pending state for later review from the administration device 132. Utilizing the administration device 132 and/or the AP 102, the administrator may assign restrictions and apply access configurations (e.g., Access configurations 1, . . . , i). The administration device 132 and/or AP 102 may send an indication of approval or denial of a Wi-Fi connection. In an embodiment, the administration device 132 and/or the AP 102 may transmit the respective PSKs to the client devices that were approved to establish a Wi-Fi connection using WPS.

In one embodiment, a client device 120 and/or the AP 102 may not support WPS, or the administrator may not wish to utilize WPS. The administration device 132 and/or the AP 102 may provision multiple PSKs to be associated with multiple client devices 120 without utilizing WPS for requesting a Wi-Fi connection by the client device(s) 120. The administrator may utilize a user interface in accordance with one or more embodiments of the disclosure in order to apply restrictions, allow access, provision PSKs, analyze statistics, create groups, etc. The administrator may then share the PSKs with the client device(s) 120 based at least in part on the administrator's provisioning of PSKs. For example, the administrator may determine that client device 124 may be limited to a predetermined time after establishing a Wi-Fi connection, and that the Wi-Fi connection may be revoked after the passage of the predetermined time. Therefore, the administrator may provision PSK 1 that may designate the predetermined time for establishing the Wi-Fi connection. The administration device 132 may be configured to transmit the respective PSKs to the respective client device 124. For example, the client device 124 may utilize PSK 1 to be authenticated with the AP 102 in order to establish a Wi-Fi connection with the AP 102. The AP 102 may apply various restrictions, for example, a time constraint to the client device 124. Similarly, the administrator may determine that client device 126 may be limited to certain data access on the Wi-Fi network, such as limiting accessibility of network hard drives, printers, other devices, etc. Consequently, the AP 102 may provision PSK 2, which may be associated with the data access limitation.

In one embodiment, an administration device 132, may be configured to mark one or more access requests received from one or more client device(s) 120 as initial requests or repeated requests. For example, a client device 120 may continually request access hoping to be approved. However, this may become a nuisance and may negatively affect the network performance. By marking a request to be an initial request or a repeated request, an administrator (e.g., user 110) may be able to deny or allow requests based on whether they are repeated multiple times. In some embodiments, the administration device 132 may be configured to reject requests that are repeated or reject requests that are coming at a predetermined time period. That is, requests that may arrive at a certain time of the day that the administrator may deem to be inappropriate may be rejected. For example, if an administrator receives request for PSK after a certain hour of the day, the administration device 132 may deny these requests. It is understood that the above are only examples and not to be construed as limitations; other preferences may be determined by the administration device 132 when handling initial or repeated requests. For example, the administration device 132 may be configured to deny all requests that are repeated more than 3 times, etc. In other examples, the administration device 132 may deny access request that are coming from a specific type of client devices 120. That is, the administration device 132 may be configured to deny access from tablets, or from laptops, etc. In other examples, the administration device 132 may be configured to automatically allow all access requests that are received at a predetermined period. For example, if the administrator is hosting an event, the administration device 132 may be configured to accept all access requests during that time. If an access request is received during that predetermined period, the request may be accepted and assigned a random PSK to be sent to the client device requesting access.

Figure 2A:
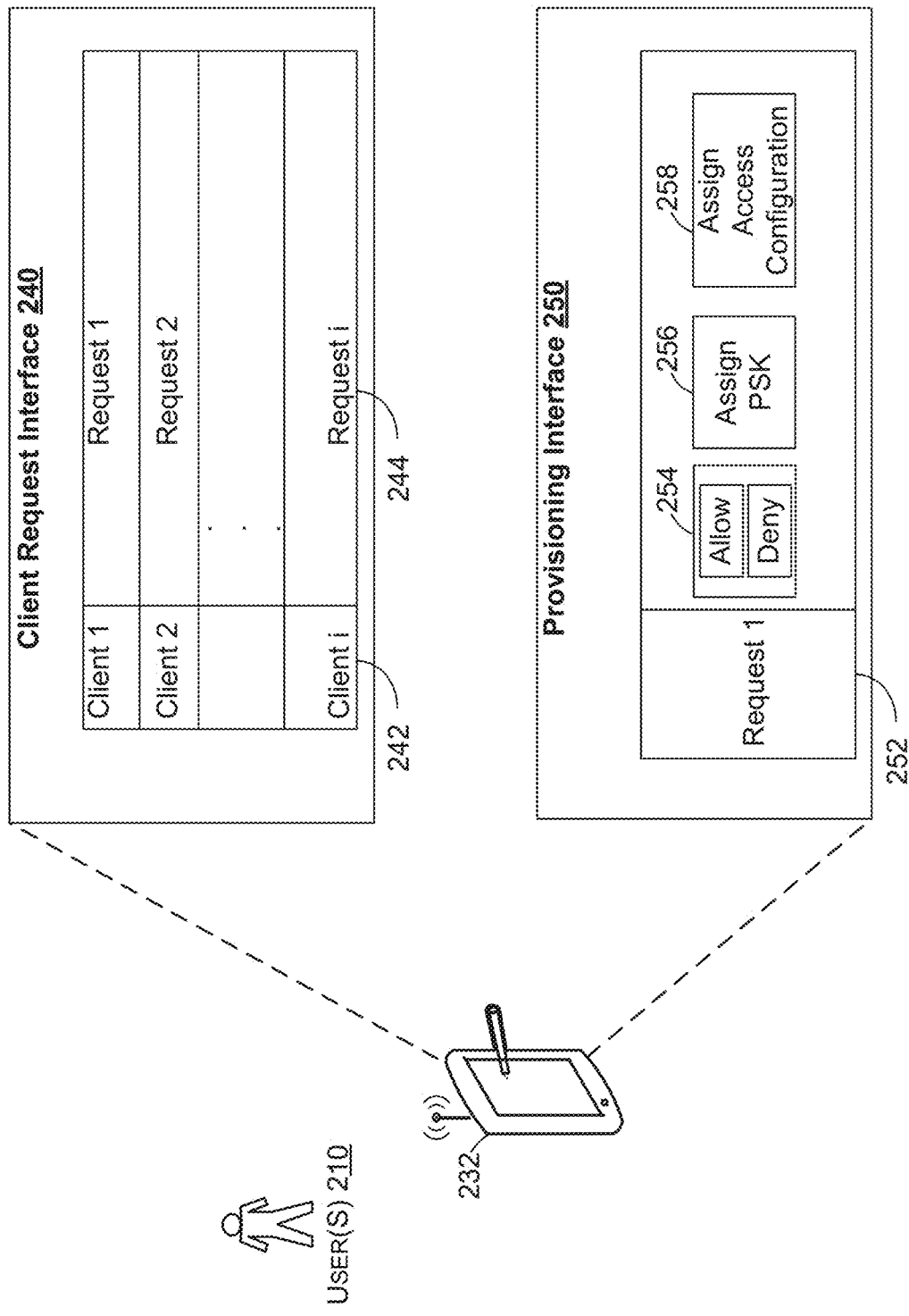
FIG. 2A depicts illustrative user interfaces for access requests associated with one or more client devices, in accordance with one or more example embodiments of the present disclosure.

FIG. 2A depicts illustrative user interfaces for access requests associated with one or more client devices, in accordance with one or more example embodiments of the present disclosure.

In one embodiment, an administrator (e.g., user 210) may access one or more user interfaces that may be displayed through an application running on the administration device 232 or through a webpage access from the administration device 232. The one or more user interfaces may include a variety of user interfaces for displaying, modifying, revoking, assigning various features in accordance with one or more embodiments of the disclosure. For example, in FIG. 2A, a client request interface 240 and a provisioning interface 250 are shown as illustrative examples of the one or more user interfaces. It is understood that although to interfaces are shown in FIG. 2A, other suitable user interfaces may also be employed in accordance with one or more embodiments of the disclosure.

In one embodiment, the administrator (e.g., the user 210) may access the client request interface 240. The client request interface 240 may provide an interface to process requests received from one or more client devices to establish a Wi-Fi connection to an AP. The client request interface 240 may be accessed through an application running on the administration device 232 or through a webpage access from the administration device 232. The client request interface 240 may list a number of clients devices 242 (e.g., Client 1, . . . , i, where i is an integer) and may include their respective requests 244 (e.g., Request 1, . . . , Request i). The client request interface 240 may include a list of requests that may be received from the AP or received directly from the client devices requesting a Wi-Fi connection. In one embodiment, WPS may be partially enabled on the AP such that the AP may receive requests for a Wi-Fi connection using WPS. The WPS may be enabled for a predetermined time that may be set by the administrator or by the AP. In order for a client device to utilize WPS to request a Wi-Fi connection, the client device should also have WPS enabled. When a client device (e.g., Client 1) sends a request (e.g., Request 1), the AP may not immediately respond to the request with an assigned PSK. That is, the AP may store the request on a memory device for later review by the administrator through an administration device before sending a PSK to the client device. The administration device may provide access to the AP through one or more user interfaces.

The client request interface 240 may receive data associated with the access requests received from the client devices 242 from the AP or from other user interfaces. The data received from the AP may include the requests 244. The client request interface 240 may process and format the data received from the AP. The client request interface 240 may present through a display on the administration device 232 one or more views related to the client devices 242 and their respective requests 244. The administration device 232 may receive input from the administrator to select one or multiple entries within the client request interface 240. The administration device 232 may perform additional actions, for example, using provisioning interface 250, based on a single selection or multiple selections on the client request interface 240. Additionally, the one or more user interfaces may include interfaces that provide additional access to an administrator in order to manipulate various features associated with the client devices 242 and their respective requests 244. The various features may include at least in part, allowing, denying the requests and further associating the particular PSK on a per client device basis or on a group of client devices basis.

In one embodiment, the provisioning interface 250 may be used to review and provide response to the one or more access requests associated with the one or more client devices. The provisioning interface 250 may receive input associated with the access requests received from the client devices 242 from other user interfaces (e.g., client request interface 240) or directly from the AP. The provisioning interface 250 may process and format the received input and may display one or more options that may be utilized to respond to the requests 244. For example, request 252 may be associated with a client device (e.g., Client 1). The administrator may access the provisioning interface 250 through an administration device 232 in order to determine whether to allow or deny the access request. The application and/or the webpage may receive input from the administrator selecting at least one request of the requests 244. For example, the administrator may access the provisioning interface 250 of the application running on the administration device 232, which may present the request 252. As discussed above, the request 252 may include a variety of different information related to the request for PSK, such as SSID of the network, the MAC address of the client device, one or more parameters associated with the request (e.g., time, signal strength, past requests, device type, location, etc.). The administrator (e.g., the user 210) may determine, using the provisioning interface 250, whether to allow or deny access using, for example, box 254, or another suitable interface feature. The provisioning interface 250 may receive input from the administrator and may process the input to determine a response to the requests 244. For example, the administrator may assign a PSK via field 256). The field 256 may be a drop-down menu or other interface feature that may present a plurality of predetermined PSKs that may be randomly assigned. In addition, the selection of the field 256 may present the administrator with a text field into which the administrator may enter a PSK. The administrator may associate an access configuration using box 258. Box 258 may be a drop-down menu or other interface feature presenting a variety of access configurations that may be selected.

The provisioning interface 250 may utilize the one or more inputs and/or selections associated with the Request 1 to, at least in part, communicate a response to the client device (e.g., Client 1). For example, the provisioning interface 250 may receive an input from the administrator to allow the Request 1 by selecting allow in box 254, assigning a PSK in field 256 and assigning an access configuration in box 258. The assigned PSK may then be utilized in the response to the Request 1. The response, including the assigned PSK may be sent to the AP. The AP may then send the assigned PSK to the client device (e.g., Client 1). The client device may then utilize that PSK in order to perform authentication with the AP to establish a Wi-Fi connection.

In one embodiment, the provisioning interface 250 may store the one or more inputs and/or selections in a memory device in order to survive power outages and/or re-initialization of administration device 232. Additionally/alternatively, the provisioning interface 250 may store the one or more inputs and/or selections on a web server associated with a webpage accessed by the administration device 232.

Figure 2B:
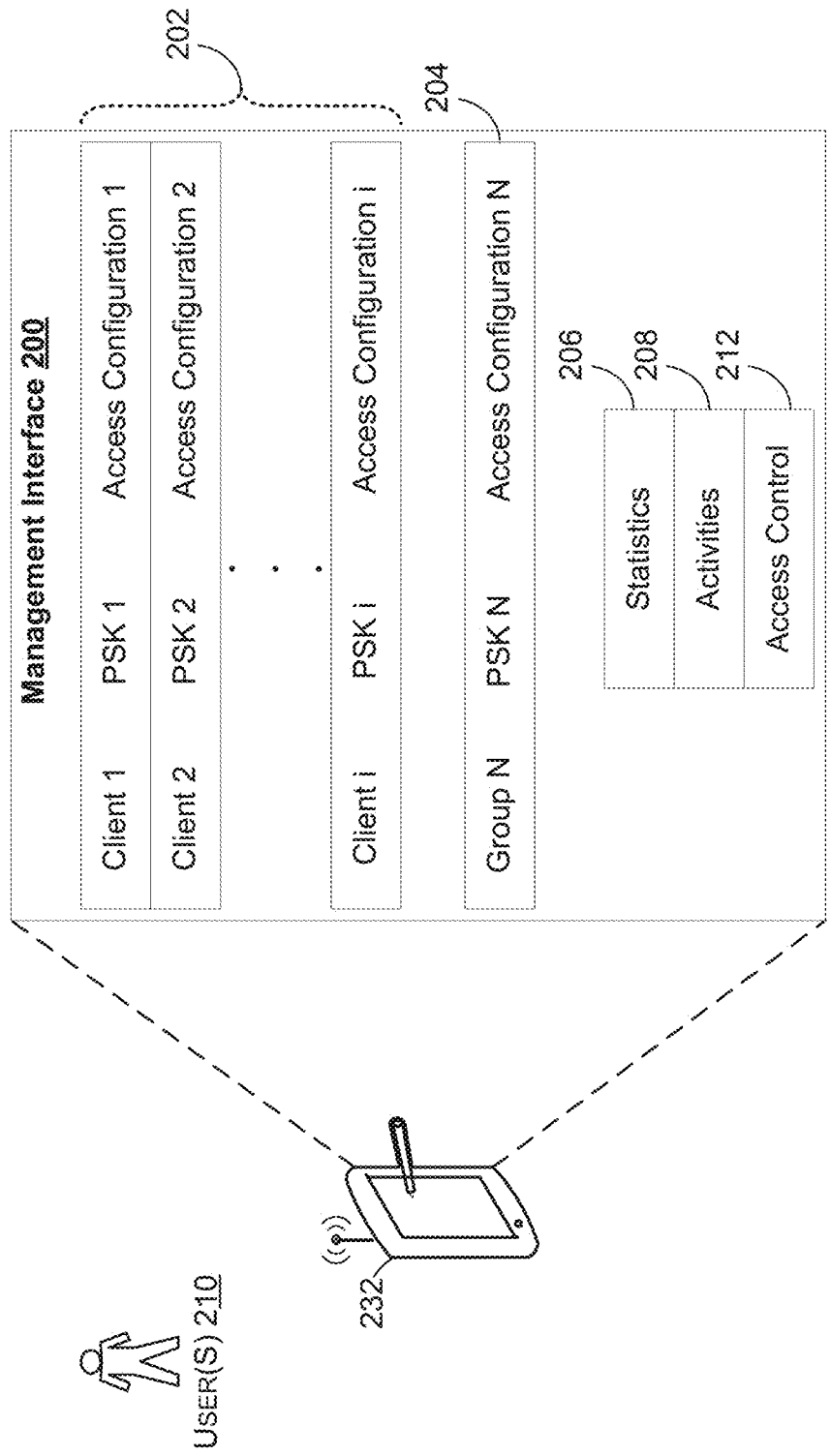
FIG. 2B depicts an illustrative schematic diagram of a controlled PSK allocation management interface, in accordance with one or more example embodiments of the present disclosure.

FIG. 2B depicts an illustrative schematic diagram of a controlled PSK allocation management interface, in accordance with one or more example embodiments of the present disclosure.

In one embodiment, an administrator (e.g., user 210) may access the management interface 200 through an application running on an administration device 232 and/or may be accessed through a webpage. The management interface 200 may provide an interface for managing one or more client devices 120 of FIG. 1 in order to maintain various levels of control over the Wi-Fi network accessibility and restrictions. For example, the management interface 200 may be used to determine the access to the AP 102 of FIG. 1 such that the various levels of control determined by the administrator via the management interface 200 are implemented by the AP 102. This would then allow an administrator to manage the AP 102 from anywhere in the world using either an application running on the administration device 232 or a webpage.

In one embodiment, when the AP is initially registered and/or provisioned, it may be associated with a particular user device, and/or user account. For example, the AP may be registered with a server in association with a user account. This may allow the administrator to access the management interface 200 using the user account, which may be accessible from a variety of locations with network accessibility.

The management interface 200 may present a list of all client devices that are authorized on the network along with restrictions that have been applied to said devices and the respective activity of each in connection with the AP. For example, entries 202 show that client devices 1, . . . , i, where i is an integer, may be associated with PSK 1, . . . , i. The administrator may utilize the administration device 232 to manage the client devices' accessibility to the Wi-Fi network. In this example, each client device may be assigned a different PSK from a plurality of PSKs, though in some embodiments multiple client devices may share a single PSK. In addition, restrictions may be applied to the accessibility to the Wi-Fi network by of these client devices based on the PSK selection. For example, client 1 may be assigned PSK 1, which may be associated with an access configuration 1. When the client device 1 is provided with the PSK 1, the client device 1 may establish a Wi-Fi connection, but only within the bounds of access configuration 1. This may provide the administrator (e.g., user 210) with flexible controls for managing restrictions to the Wi-Fi network. The restrictions may include, at least in part, time of day access restrictions, automatic revocation on a certain data, revocation of access after a certain amount of time, bandwidth limits, relative priority compared to other machines on the network, access to other machines on the network, access to the internet, parental control site restrictions, etc. The administrator may select one or more entries within the management interface 200 in order to perform actions on the selection. By selecting an entry within the management interface, the administrator may be able to access additional interfaces to manipulate various options associated with the access requests.

For example, a parent may wish to limit the access of a child's device after a passage of time or after a certain time of day. The parent may provide the child's device with a PSK that may be associated with an access configuration that is in line with the parents requirements for the child. When the child's device utilizes that particular PSK to authenticate with the AP in order to establish a Wi-Fi connection, the AP would implement the access configuration associated with that PSK after authentication. This in turn, will only affect client devices that have that particular PSK and does not affect the other client devices that have different PSKs because different PSKs may be associated with different access configurations.

In one embodiment, the management interface 200 may also be configured by the administration devices to change restrictions, temporarily disable access, revoke access, or any other access control required by the administrator. For example, an access control 212 may be initiated to provide the administrator with the ability to make modification to the various access configurations associated with the plurality PSKs. For example, the administrator may wish to revoke access to a client device that was previously allowed access to the Wi-Fi network. For example, during a visit, the visitor may request a Wi-Fi connection within the visiting premises. The administrator may utilize an administration device 232 in order to assign a particular PSK to be associated with the visitor at a particular access configuration. For example, the visitor may be allowed only a certain bandwidth on the Wi-Fi network, or have limited access to machines on the network, etc. The administrator may revoke the Wi-Fi connection after the visitor leaves the premises. The revocation may be automatic (e.g., after a certain passage of time, after the visitors device disconnects from the Wi-Fi network, etc.), or may be manually implemented by the administrator. Further, the administrator may temporarily disable access of a client access that was previously allowed a Wi-Fi connection. For example, the administrator may access the management interface 200 using the administration device in order to modify the access configuration assigned to a client device. For example, after assigning a PSK and associating the PSK to a certain access configuration the client device, the administrator may then modify the access configuration to modify the access configuration, revoke access, or temporarily disable access. After the modification, the AP may implement the access configuration change to the Wi-Fi connection that was previously established with the client device. For example, if a mobile device was sent a PSK and the access configuration assigned to that PSK was to limit the mobile device to only access a particular machine on the Wi-Fi network associated with the AP, the access configuration may be modified to allow the client device access to other machines on the Wi-Fi network. The administrator may select one or multiple entries from entries 204 and 204 to perform additional actions. The additional actions may be associated with assigning a PSK, modifying a PSK, modifying an access configuration, revoking access, grouping entries, assigning categories, etc. For example, the administrator may select two entries associated with two client devices and group these entries together based on common characteristics, such as, device type, IP address, location, device ID, etc. It is understood that the above descriptions are for purposes of illustration and are not meant to be limiting.

In one embodiment, Wi-Fi network statistics (e.g., statistics 206) associated with the one or more client devices may be maintained and reported by the management interface 200. For example, the administrator may access statistics 206 of management interface 200 in order to determine one or more statistics during a client device's access to the Wi-Fi network service by the AP. Some of these one or more statistics may include, but not limited to, amount of bandwidth utilized, amount of data utilized, devices accessed by the client device, etc. For example, the statistics 206 may comprise data collected from the AP associated with a client device's access to the Wi-Fi network. The data may be stored on a memory device of the AP and may be sent to the administration device 232 periodically or at a predetermined time. It should be understood that the above are only examples of statistics that may be captured by the AP and/or the administration devices while a client device gained access to the Wi-Fi network service by the AP.

In one embodiment, the management interface 200 may be configured to capture one or more activities. For example, activities 208 may provide a list of activities that may have been performed by one or more client devices after establishing a Wi-Fi connection. The list of activities may include duration of access to the Wi-Fi network by the client device, the last active time of the client device. The management interface 200 may also include It would also include an option to view a calendar/graph that shows all of the days and times the client has been active. The activities 208 may indicate to the administrator (e.g., user 210), strange or unexpected activities performed by one or more client devices. The administrator may select activities 208 by providing input to the application running on the administration device 232 or by providing input to a webpage. The activities 208 may access a memory device containing data associated with the activities performed by one or more client devices. The activities may have been stored on the AP, on the administration device 232, and/or on a Web server. For example, the activities 208 may indicate whether a child's device had established a Wi-Fi connection late at night. It is understood that the above is only an example of activity of a child's device and that other activities may be indicated by activities 208 of the management interface 200.

In one embodiment, the management interface 200 may be configured to provide access control associated with client devices requesting a Wi-Fi connection. For example, access control 212 may provide the administrator with the capability to manage requests for access, access configurations, and restrictions that may be maintained by the management interface 200.

When a client device wishes to gain access to the Wi-Fi network, the client device may request a Wi-Fi connection. Requests for access by one or more client devices may be received by the AP, and may be queued on a memory device of the AP or may be sent as a notification to the administration device 232. The notification may be sent to the administration device via a number of mechanisms such as email, short message service (SMS), instant messaging (IM), cellular network, Wi-Fi network, near field communication (NFC), Bluetooth, sound, supersonic signals, subsonic signals, non-voice audio signals, voice signals, or any other means of notifications. It is understood that the above are only examples, and not to be considered limitations to the means of notifications.

In one embodiment, automatic revocation may be persistent during power outages or crashes by adding a check to determine when a client device reconnects to the Wi-Fi network. For example, a client device may be assigned a particular PSK associated with a particular access configuration. The access to the Wi-Fi network may be revoked by the AP, the administration device, or the administrator (e.g., user 210). However, if a power outage occurs after the access to the Wi-Fi network has been revoked, the revocation may be maintained after the power is restored and the AP has reinitialized. This may prevent and knowing the revocation by restarting AP, or the administration device. In order to achieve that, the access control 212 may maintain the data associated with the management interface 200 in a non-volatile memory device, which may survive power outages and/or restarts of the AP, and/or the administration device.

In one embodiment, the management interface 200 may be configured to provide one or more groups of client devices (e.g., group 204) with a single PSK having a particular access configuration on a per group basis. For example, with reference to the entry 204 of the management interface 200, the Group N may be assigned a PSK N, associated with access configuration N, where N is an integer. In other words, Group N may be comprised of one or more client devices that may have requested a Wi-Fi connection to the AP. For example, during a social event at a home with a Wi-Fi network service by an AP, client devices present at the home requesting a Wi-Fi connection may have an access configuration associated with these client devices. For example, during a Super Bowl party, an administrator of the home Wi-Fi network may determine that guests to the Super Bowl party may be given a particular PSK in order to restrict the guests access to the Wi-Fi network without having to impact other client devices (e.g., desktops, IoT devices, printers, etc.) that may have already gained access to the Wi-Fi network within the home. With that setup, the administrator (e.g., user 210) may access the management interface 200 using administration device 232 in order to assign/provision the PSK associated with the guests. The administrator may have provisioned the access configuration associated with the PSK to revoke the Wi-Fi connection at the conclusion of the Super Bowl party, at a predetermined time, or at a predetermined data usage limits, etc.

Figure 3:
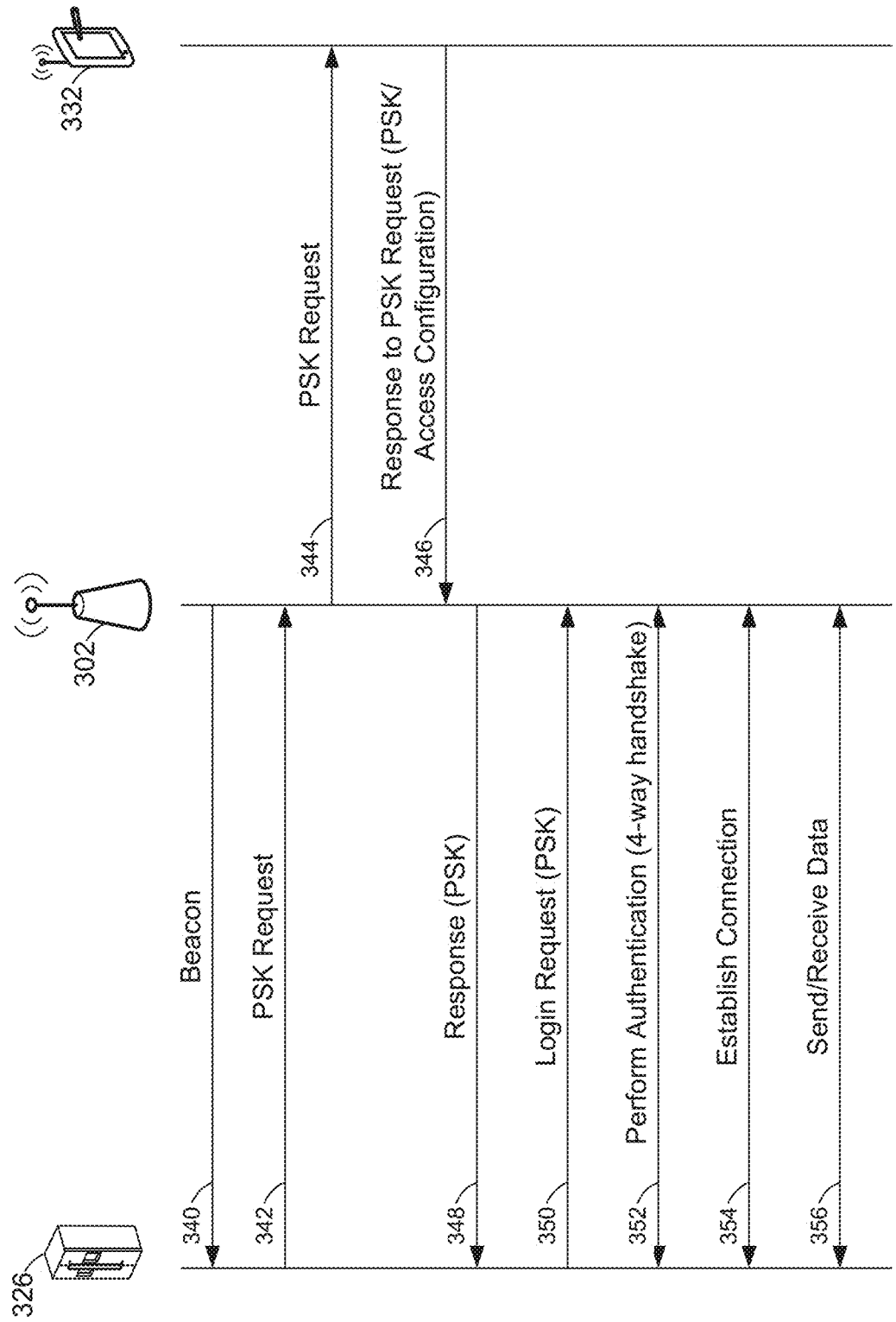
FIG. 3 depicts an illustrative flow diagram for establishing access to a Wi-Fi access point, in accordance with one or more example embodiments of the present disclosure.

FIG. 3 depicts an illustrative message flow for establishing access to a Wi-Fi AP, in accordance with one or more example embodiments of the present disclosure. Illustrated are the IoT device 326, AP 302, and the administration device 332.

The AP 302 may send a beacon frame 340 to one or more client devices, including the IoT device 326.

The AP 302 may periodically send one or more management frames called beacon frames (e.g., beacon frame 340). The purpose of beacon frames is to advertise the presence of an AP in an area, its capabilities, and some configuration and security information to the client devices. For example, the beacon frame 340 may include whether the AP 302 may support WPS or other security mechanism that may be supported by the AP 302. The IoT may receive the beacon frame 340 and may determine whether to utilize WPS or other security mechanisms when communicating with the AP 302.

The IoT device 326 may send an access request 342 to the AP 302 requesting a Wi-Fi connection to the AP. The access request 342 may be a request for a PSK that may be used to authenticate the IoT device 326. The access request 342 may contain device information. The device information may include, at least in part, the service set identifier (SSID) of the network, the MAC address of the client device, one or more parameters associated with the request (e.g., time of day, signal strength, past requests, location, etc.), device type (e.g., laptop, tablet, IoT devices, etc.), the identification of the user associated with the client device, etc. Other device information may also be provided by the client device or requested from the client device.

The AP 302 may generate the PSK request 344 based at least in part on the device information received in the access request 342. For example, the AP may extract device information from the access request 342. One or more of the device information may be provided in the PSK request 344 in order to provide the administration device 332, with data that may be used by the one or more user interfaces (e.g., user interfaces 134 of FIG. 1). The AP may send the PSK request to the administration device 332 to notify the administration device of the request received from the IoT device 326. Alternatively, the AP 302, may bypass sending the PSK request 344 and may respond directly to the IoT device 326 by assign a PSK randomly or based on the device information, and in either case, the PSK may be unique to that request.

In response to receiving the PSK request 344, the administration device 332 may determine whether the received request is an initial or a repeated request. For example, each time a request is received from the same client device, the request may be marked. Marking a request may involve incrementing a client request counter, setting a flag, etc., as may be tracked using the MAC of the requesting IoT device 326. By determining a request to be an initial request or a repeated request, an administrator, accessing an application on the administration device 332 and/or accessing a webpage on a Web server, may be able to deny or allow requests based on whether they are repeated multiple times. The administration device 332 may determine automatically without administrator input whether to allow or deny the access request. The determination may be performed by the application executed on the administration device 332 and/or by accessing the webpage on a Web server. The determination may be based on device information received from the client device and/or based on whether the access request is an initial request or a repeated request. The device information may be received in the request message or may be separately requested by the AP. The administration device may associate an access configuration with the client device such that the access configuration may be enforced when establishing the Wi-Fi connection with the client device. The PSK may be selected by the administrator or may be automatically selected by the administration device based on the device information received from the client device. The PSK may be associated with the selected access configuration. The access configuration may include, in part, time of day access restrictions, automatic revocation on a certain data after a certain amount of time, bandwidth limits, relative priority compared to other machines on the network, access to other machines on the network, access to the internet, parental control site restrictions.

The administration device 332 may send a response 346 to the PSK request 344, such that the response 346 may include the PSK that is associated with the access configuration assigned to that PSK, and thus, assigned to the IoT device 326.

The AP 302 may generate a response 348 based at least in part on the response 346 received from the administration device 332, which may include at least in part the assigned PSK. In addition, the AP 302 may utilize the device information received from the IoT device 326 in order to send the assigned PSK to the correct client device. The AP 302 may send a response 348 to the IoT device 326. The IoT device 326 may then send a login request 350, including at least in part, the assigned PSK. The AP 302 may then determine whether the PSK received in the login request 350 is the same as the assigned PSK. If the AP 302 determines that the PSK received in the login request 350 is the same as the assigned PSK, the AP may determine that there is a match of PSKs. In that case, the AP 302 and the IoT device 326 may perform authentication, for example, using a four-way handshake in accordance with IEEE 802.11. The four-way handshake may utilize the PSK to yield an encryption key used to encrypt and decrypt messages between the AP 302 and the 326. The AP 302 and the IoT device 326 may establish connection 354 to the Wi-Fi network serviced by the AP 302. At this point, the IoT device 326 and the AP 302 may send and receive data 356 using the encryption key. Since the PSK and the encryption key are associated with the client device, the communication between the AP 302 and the IoT device 326 is secure and resistant to hacking.

Figure 4:
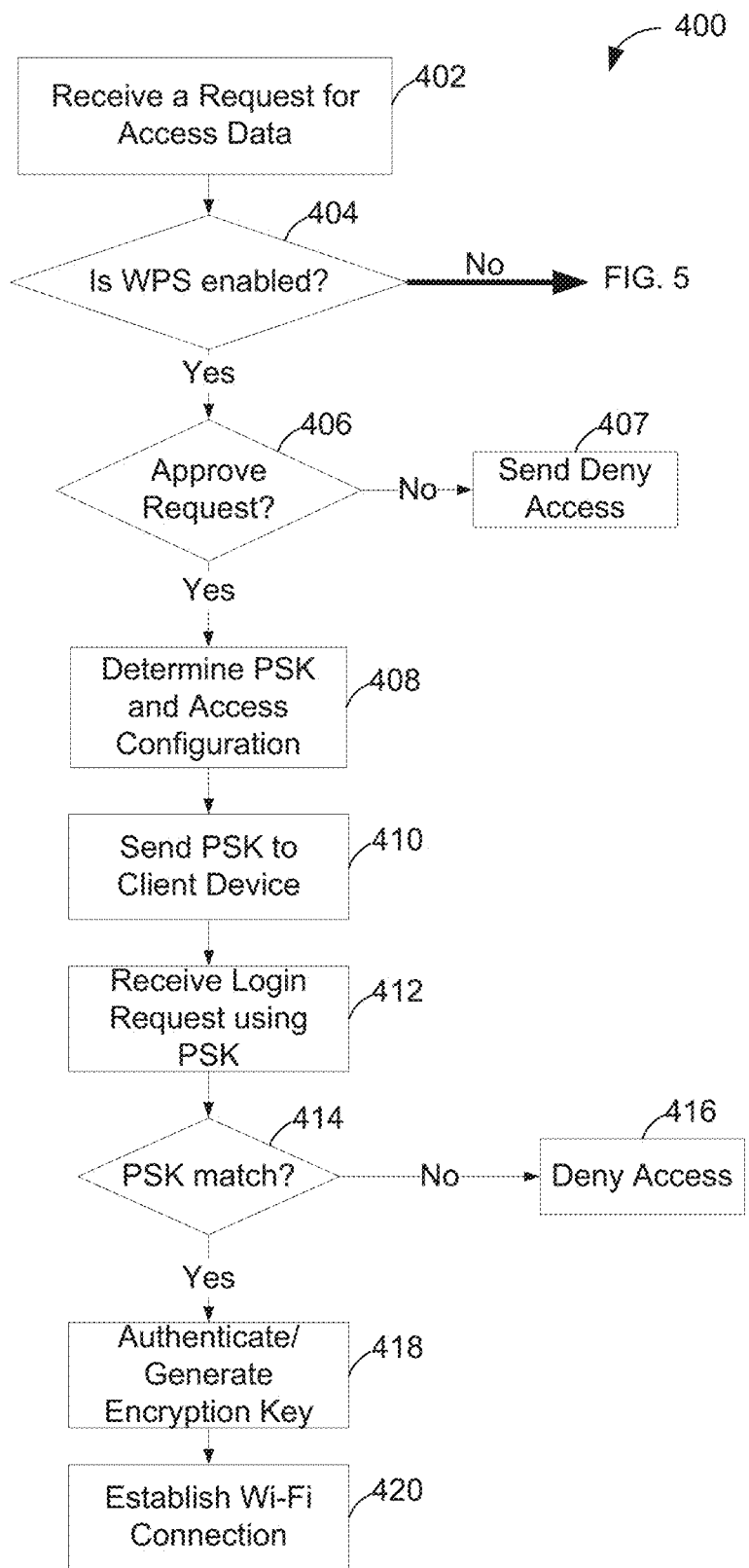
FIG. 4 depicts a flow diagram of an illustrative process for an illustrative controlled PSK allocation, in accordance with one or more embodiments of the disclosure.

FIG. 4 depicts a flow diagram of an illustrative process 400 for an illustrative controlled PSK allocation, in accordance with one or more embodiments of the disclosure.

The administration device and/or the AP may determine one or more PSKs associated with various access configurations, where specific PSKs and an associated access configuration may be assigned to individual client devices or a group of client devices.

At block 402, a Wi-Fi connection request may be received from a client device to establish a Wi-Fi connection with an AP.

At block 404, the AP may determine whether the request is received using a WPS mechanism. The AP and the client device may support WPS as a security mechanism for providing the PSK to the client device. In order for WPS to work, both the AP and the client device must have WPS supported and enabled. For example, the AP may have WPS partially enabled over a period of time, such that the client device may utilize the WPS mechanism to request a Wi-Fi connection. WPS allows a client device to connect to an AP without having to enter a PSK at the client device but instead either automatically connecting to the AP by simply enabling WPS on both the client device and the AP or by having the client device enter a password or a PIN in order to start the authentication process to establish a Wi-Fi connection. Having WPS partially enabled during a period of time permit the AP to accept requests from new client devices 1 during that period of time. It should be noted that WPS is provided as an example only and that other security mechanisms may be employed to send and receive a PSK.

In case WPS is not enabled on either the AP or the client device requesting a Wi-Fi connection, the process flow may continue with FIG. 5 (described below).

At block 406, the AP may determine whether to approve or deny the request for PSK to connect to the Wi-Fi network. The determination may be based on device information received from the client device. The AP may extract the device information from at least in part, an access request message received from the client device requesting access. The device information may include, at least in part, the SSID of the network, the MAC address of the client device, one or more parameters associated with the request (e.g., time of day, signal strength, past requests, location, etc.), device type (e.g., laptop, tablet, IoT devices, etc.), the identification of the user associated with the client device, etc. Other device information may also be provided by the client device or requested from the client device. If the client device was denied access to the Wi-Fi network based at least in part on the device information provided by the client device, the AP may send the client device an access denied message 407. Subsequently, the client device may choose to send another request to establish a Wi-Fi connection at a later time.

At block 408, the AP may determine a PSK that may be associated with an access configuration that determines the access restrictions/limits. Restrictions may include, at least in part, time of day access restrictions, automatic revocation on a certain data after a certain amount of time, bandwidth limits, relative priority compared to other machines on the network, access to other machines on the network, access to the internet, parental control site restrictions for the client device's Wi-Fi connection. The AP may randomly generate the PSK, or it may send a PSK request to an administration device in order to acquire a PSK based at least in part on a response received from the administration device. The AP may associate an access configuration with the PSK, which places access restrictions/limits to the Wi-Fi network during the Wi-Fi connection for the client device that requested access. In case the AP sends a PSK request to the administration device, the administration device may deny or allow the access request by sending a response message to the PSK request. The administration device may include in the response message to the PSK request the assigned PSK that may be sent to the client device by the AP.

At block 410, the AP may send the assigned PSK to the client device in response to receiving the access request message from the client device. The assigned PSK may be associated with an access configuration that may have been determined by the AP and/or the administration device utilizing an application running on the administration device or a webpage accessible by the administrator. In another embodiment, the administrator may directly provide the assigned PSK to the client device. The client device may utilize the assigned PSK for the authentication process with the AP before establishing the Wi-Fi connection.

At block 412, the AP may receive from the client device a login request, including at least in part, the assigned PSK. The login request is sent by the client device when the client device determines when to start a Wi-Fi connection with the AP. It is not necessary that the client device send a login request immediately after receiving the PSK from the AP and/or the administration device. However, there may be time restrictions and time expiration associated with the assigned PSK. In that sense, the example here assumes that the client device sent the login request before triggering any time restrictions and before expiration of the PSK.

At block 414, the AP may utilize the received PSK to compare with the PSK that was assigned to the client device. In case there is a match, the AP may continue to perform one or more actions in order to establish the Wi-Fi connection with the client device.

At block 416, in case the PSK did not match what was assigned to the client device on the AP, the AP may send an access denied message to the client device. In some examples, the access denied message may contain the reason for the denial. For example, the access denied message may assign a PSK mismatch reason to be sent in the access denied message. In this case, the client device may have sent the incorrect PSK in error, and the client device may determine whether to resend the login request with the correct PSK.

At block 418, the AP may authenticate the client device based at least in part on the assigned PSK. The AP may perform a WPA/WPA2 four-way handshake in accordance with IEEE 802.11i in order to authenticate the client device. Another key may be generated during the four-way handshake. Using the PSK, a pairwise master key (PMK) may be derived on both the AP and the client device requesting a Wi-Fi connection. Instead of disclosing the key, the AP and the client device may encrypt messages to each other, which can only be decrypted by using the PMK that the AP and the client device share. The four-way handshake is designed so that the AP and the client device can independently prove to each other that they know the PSK/PMK, without disclosing the key.

At block 420, the AP may initiate the Wi-Fi connection with the client device. The AP and the client device may then send and receive data using the derived encryption key (e.g., PMK).

Figure 5:
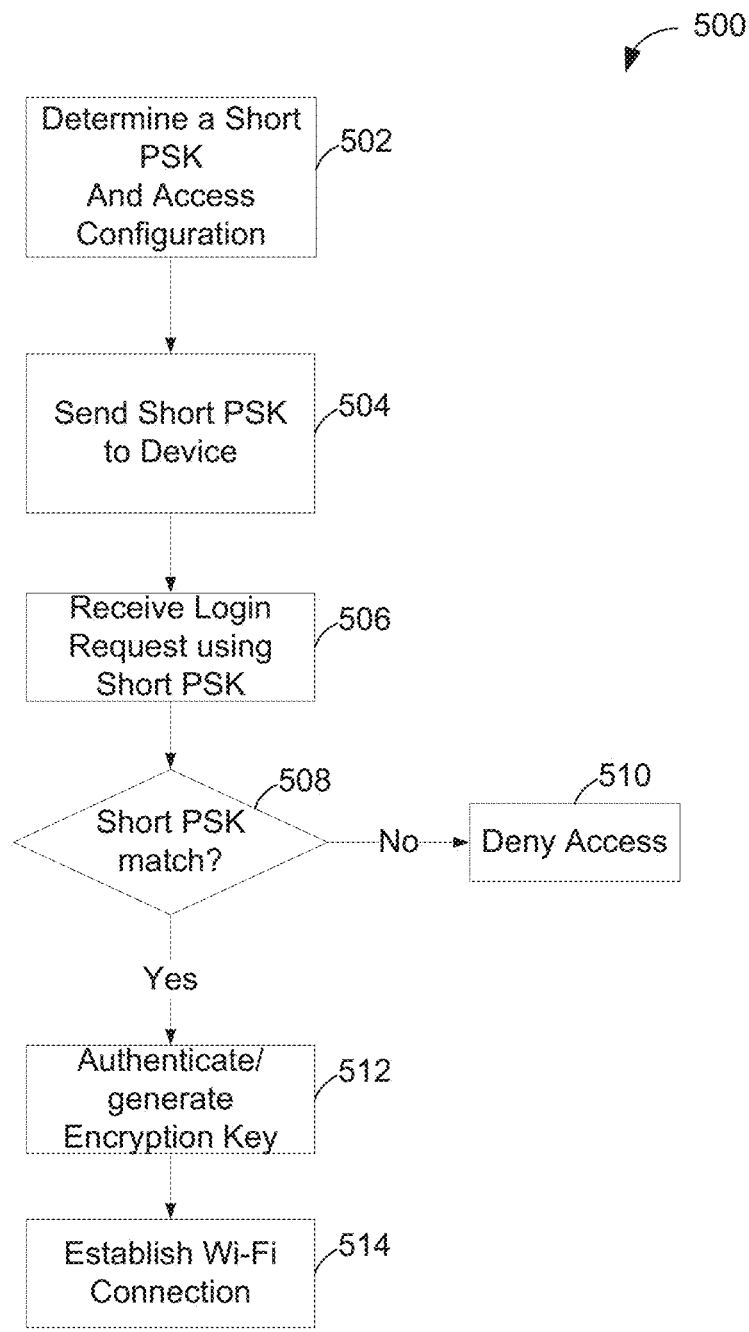
FIG. 5 depicts a flow diagram of an illustrative process for an illustrative controlled PSK allocation, in accordance with one or more embodiments of the disclosure.

FIG. 5 depicts a flow diagram of an illustrative process 500 for an illustrative controlled PSK allocation, in accordance with one or more embodiments of the disclosure.

Some client devices may not support WPS (or other security mechanisms) and/or administrator may not be in favor of enabling WPS because of WPS security risks. The client device may not be able to establish a Wi-Fi connection without being first authenticated with the AP. If the AP and/or the client device do not support WPS, then an administrator may provide the PSK to the client device or a shortened PSK may be sent to the client device from the AP upon approval by the administrator.

At block 502, the AP may determine a short PSK that may be smaller than 64 bytes. It should be understood that although a short PSK is assigned, it may be possible to assign a long PSK or any PSK. The short PSK may be easier to communicate and to utilize. The AP may associate the PSK with an access configuration based at least in part on device information received from the client device. For example, the AP may associate an access configuration with the client device based at least on the fact that the client device is a child's client device or based on other device information. The access configuration determined may be assigned to the short PSK. The short PSK with then be shared with the client device in order to apply the access configuration chosen by the estimate administrator and/or the AP.

At block 504, the AP may send the short PSK to the client device using one or more communication mechanisms. Some of the communication mechanism may include, at least in part, an application on the client device, SMS, cellular network, Wi-Fi network, IM, NFC, Bluetooth, sound, or any other means. It is understood that the above are only examples, and not to be considered limitations.

At block 506, the AP may receive a login request from the client device. After the client device requesting access acquires the short PSK, the client device may continue to send a login request to the AP. However, in the case the client device does not send a login request utilizing the PSK, the AP and/or the administrator may revoke access. For example, the AP and/or the administrator may place a restriction on the PSK such that if the PSK is not used by a certain time, or within a predetermined period, the PSK may be revoked and may not be associated with that client device. The client device would have to request access again.

At block 508, when the AP receives the login request from the client device, the AP may retrieve, among other things, the short PSK. The AP may then perform a comparison of the received short PSK to the originally assigned short PSK.

At block 510, if the received short PSK is different from the originally assigned short PSK, the AP may reject the login request and may send an access denied message to the client device. The client device may reattempt to login again with a corrected PSK. However, the AP and/or the administration device may be configured to keep a count of the number of login attempts and may set a threshold for such attempts. For example, if the login attempt exceeds the threshold, the AP and/or administration device may block requests received from that particular client device. Blocking requests may involve either ignoring the requests or revoking the PSK that was originally assigned to the client device. It is understood that the above are only examples of blocking a request and that other mechanisms may be employed to block requests received from a client device.

At block 512, in case the received short PSK is the same as the originally assigned short PSK, the AP may perform authentication. The authentication may be performed using a four-way handshake in accordance with IEEE 802.11. The four-way handshake may result in an encryption key (e.g., PMK) that may be utilized to encrypt and/or decrypt messages sent and received between the client device and the AP.

At block 514, when authentication is complete, the AP may establish the Wi-Fi connection with the client device. The client device may be permitted to send and receive data using the Wi-Fi connection and using the encryption key. The Wi-Fi connection may be limited by the access configuration that was originally associated with the short PSK (at block 502). For example, the access configuration may limit the duration of time for the Wi-Fi connection to the AP. After passage of the time duration, access may be revoked by the AP and/or the administration device.

Figure 6:
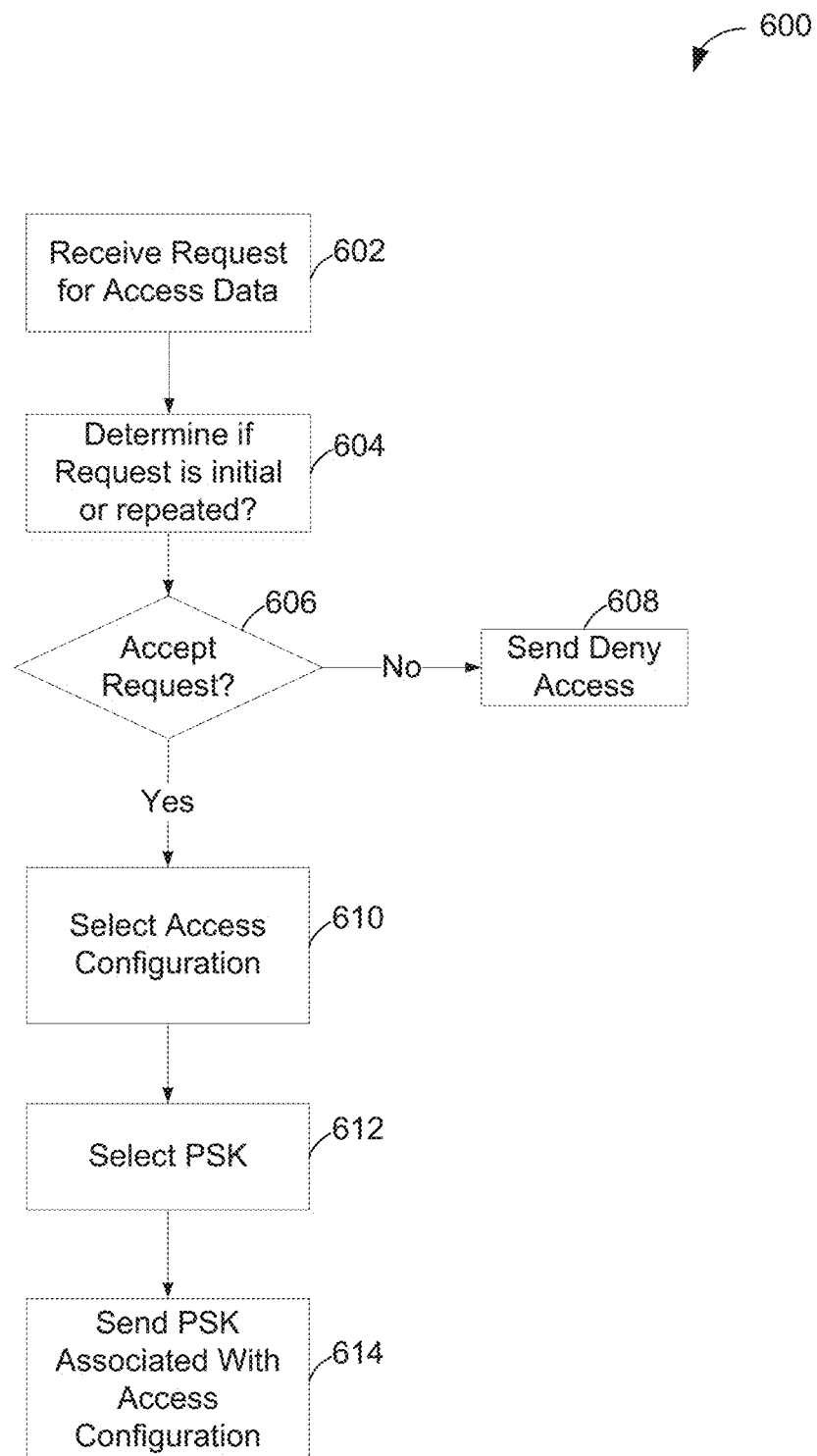
FIG. 6 depicts a flow diagram of an illustrative process for an illustrative controlled PSK allocation, in accordance with one or more embodiments of the disclosure.

FIG. 6 depicts a flow diagram of an illustrative process 600 for an illustrative controlled PSK allocation, in accordance with one or more embodiments of the disclosure.

In case WPS is enabled on both the AP and the client device, an administration device may perform one or more actions in order to determine a PSK and an access configuration associated with the client device accessing the Wi-Fi network. The AP may also store the request for PSK to access the Wi-Fi network received from the client device for later retrieval by an administration device. In case the AP stored the request for later retrieval by the administration device, the AP may place the request in a pending state until a response is generated to notify the client device whether the access request has been granted or denied. In some cases, the AP may notify the client device of the pending state. The AP may optionally send notification to an administration device (e.g., a client device or a webpage) that may be associated with an administrator of the AP and the Wi-Fi network. The administrator of the Wi-Fi network may utilize the administration device to review pending requests. The administration device may perform one or more actions in accordance with FIG. 6 to determine a PSK and an access configuration associated with the client device accessing the Wi-Fi network.

At block 602, the administration device may receive an indication or a received request for PSK to connect to the Wi-Fi network managed by the administrator. For example, one or more access requests may be associated with one or more client devices. The access requests may contain one or more device information such that the administration device may determine the identity of the client device requesting a Wi-Fi connection to the AP. Some of the device information may include a type of client device (e.g., laptop, tablet, IoT devices, etc.), the MAC address of the client device, the identification of the user associated with the client device, time of the day, etc. It is understood that the above are only examples of device information that may be received from the client device and should not be considered as limitation. Other information may also be provided by the client device or requested from the client device.

At block 604, the administration device may determine whether the received request is an initial or a repeated request. For example, each time a request is received from the same client device, the request may be marked. Marking a request may involve incrementing a client request counter, setting a flag, etc. By marking a request to be an initial request or a repeated request, an administrator may be able to deny or allow requests based on whether they are repeated multiple times.

At block 606, the administration device may determine whether to allow or deny the access request. The determination may be based on device information received from the client device and/or based on whether the access request is an initial request or a repeated request. The device information may be received in the request message or may be separately requested by the AP.

At block 608, if the request is denied, the administration may send an access denied message in response to the access request message. The response may contain a reason for the denial. Subsequently, the client device may choose to send another request to establish a Wi-Fi connection at a later time.

At block 610, the administration device may associate an access configuration with the client device such that the access configuration may be enforced when establishing the Wi-Fi connection with the client device.

At block 612, the administration device may select a PSK to be assigned to the client device. The PSK may be selected by the system administration or may be automatically selected by the administration device based on the device information received from the client device. The PSK may be associated with the selected access configuration (e.g., block 610). That is, when the PSK is sent to the client device, the Wi-Fi connection may be established using the access configuration that was assigned to the client device and the PSK. The assigned PSK may be associated with a certain access configuration that may restrict access of the Wi-Fi connection to a timeframe, to a bandwidth limit, type of client device, user of the client device, etc. In other words, the administrator may assign restrictions to the Wi-Fi connection requested by the client device.

At block 614, the administration device may send the assigned PSK to the AP or to the client device directly. The AP may then send the assigned PSK to the client device such that the client device may use the assigned PSK to continue the authentication process before establishing a Wi-Fi connection with the AP.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a client device 120 (FIG. 1) in accordance with some embodiments.

The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiment, the processing circuitry 706 may include an internal memory component. In some embodiments, the communications circuitry 702 and the processing circuitry 706 may be configured to perform operations detailed in FIGS. 2-5.

In accordance with some embodiments, the communications circuitry 702 may be arranged to contend for a wireless medium and configure frames or packets for communicating over the wireless medium. The communications circuitry 702 may be arranged to transmit and receive signals. The communication circuitry 702 may be directly connected to the processing circuitry 706. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device may, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a controlled PSK allocation device 819, a network interface device/transceiver 820 coupled to antenna(s) 830, and one or more sensors 828, such as a global positioning system (GPS) sensor, compass, accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The controlled PSK allocation device 819 may carry out or perform any of the operations and processes (e.g., processes 400, 500, and/or 600) described and shown above.

The controlled PSK allocation device 819 may perform steps to determine whether a client device is allowed to establish a Wi-Fi connection to an access point (AP). The controlled PSK allocation device 819 may be configured to provision one or more PSKs on a per client device or per group of client devices basis. The controlled PSK allocation device 819 may be configured to assign a particular PSK to the client device in order to establish a Wi-Fi connection. The client device may be required to provide a PSK so that the AP and the client device may establish a secure connection for the Wi-Fi connection. The client device may request the PSK from the AP and/or an administrator. The request may contain information associated with the client device. Some of the information may include the media access control (MAC) address of the client device, the type of client device, etc. The AP may assign a particular PSK to the client device based partly on the information received from the client device and based on an access configuration to be enforced when establishing the Wi-Fi connection.

The controlled PSK allocation device 819 may be configured to provide a management interface for provisioning an AP with one or more PSKs to be associated with one or more client devices. For example, the management interface may be an application running on an administration device and/or a website accessible by an administrator of the AP. The application and/or website may provide one or more display and control features that may be maintained by the AP. The one or more display and/or control features may include features to display a list of client devices that may be authorized to establish a Wi-Fi connection along with any restrictions that may have been applied to the client devices. Further, the one or more display and/or control features may provide a log of activities performed by these client devices. Even further, the one or more display and/or control features may also maintain a calendar that shows these activities. The application and/or webpage may also facilitate assigning access restrictions, temporarily disabling access, or modifying access configurations.

The controlled PSK allocation device 819 may be configured to provide the end user with easy controls for access restrictions/limits. Restrictions may include, at least in part, time of day access restrictions, automatic revocation on a certain data after a certain amount of time, bandwidth limits, relative priority compared to other machines on the network, access to other machines on the network, access to the internet, parental control site restrictions. Automatic revocation can be made robust against power outages or crashes, but adding a check when a client reconnects to a network. For example, if an administrator revokes access to a mobile device and later a power outage occurs, when the mobile device reconnects to the network using the previously assigned PSK, the controlled PSK allocation system may check previous revocation and modifications to the access configuration assigned to the mobile device.

The controlled PSK allocation system may facilitate enabling Wi-Fi Protected Setup (WPS) for a predetermined time frame on the AP. The AP may accept requests for access from client devices within the predetermined time frame. However, the AP may not immediately provide the client device with a specific PSK. Instead, the request for PSK may be placed in a pending state. The administrator may utilize an administration device and/or may access a webpage in order to review the pending requests in order to approve or deny them. The administrator may select access restrictions to be associated with specific PSK that may be allocated for that client device. The request may be stored on a memory device of the AP such that administrator of the AP may determine whether to allow or deny the request. However, in some instances, the laptop, or any other WPS enabled device, may timeout before receiving a response to the request. In that case, the administrator may continue to determine the access configuration associated with the laptop, approve the access request, and assign a specific PSK to be used by the laptop. The client device may retry the access using WPS, at which point the administrator may have determined the specific PSK to be assigned to that laptop. The AP may determine that the laptop has been approved but did not retrieve the PSK yet. Consequently, the AP may provide the laptop with the PSK. In some embodiments, the administration device and/or the webpage used by the administrator may be able to maintain whether a request is a new request, or a repeated request. This may provide the administrator with a layer of security in order to determine whether an attack is ensuing. It should be noted that WPS is provided as an example only and that other security mechanisms may be employed to send and receive a PSK.

In that scenario, the controlled PSK allocation device 819 may be configured to generate a new PSK that may be shorter than 64 bytes when client devices may not support WPS and/or administrator may not be in favor of enabling WPS because of WPS security risks. The administrator may continue to associate the new PSK with one or more access restrictions based at least in part on the client device requesting access. For example, an IoT device without WPS support, may be assigned a short PSK having a shorter than 64 bytes in size. It should be understood that although a short PSK is assigned, it may be possible to assign a long PSK or any PSK. The short PSK may be associated with restrictions, such as limiting the data bandwidth that may be used by the IoT device. The delivery of the new PSK to devices that do not have WPS enabled may be accomplished through a number of mechanisms. The mechanisms may include delivery through a cellular network, Wi-Fi network, near field communication (NFC), Bluetooth, short message service (SMS), instant messaging (IM), supersonic signals, subsonic signals, non-voice audio signals, voice commands, or any other mechanism for data communication. Continuing with the example of the IoT device, the AP may deliver the new PSK to the IoT device using Bluetooth. The IoT device may then utilize the new PSK in order to establish a Wi-Fi connection.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes (e.g., processes 400, 500 and 600) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "client device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD- ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device comprising: memory that stores computer-executable instructions; and at least one processor configured to access the memory and execute the computer-executable instructions to: receive first data that identifies a first device; receive second data that identifies a second device; determine, using the first data, a first set of restrictions associated with access to a wireless network by the first device; determine, using the second data, a second set of restrictions associated with access to the wireless network by the second device, wherein the second set of restrictions are different than the first set of restrictions; determine that the first device is attempting to access the wireless network outside a first time window that is permitted by the first set of restrictions; and prevent the first device from accessing the wireless network.

2. The device of claim 1, wherein the at least one processor is further configured to execute the computer-executable instructions to: determine that the second device is attempting to perform an action that is restricted by the second set of restrictions during a time window that is permitted by the second set of restrictions; and prevent the action from being performed.

3. The device of claim 2, wherein the device is an access point, and wherein the action is (i) sending data, or (11) a request to access content data.

4. The device of claim 1, wherein the at least one processor is further configured to execute the computer-executable instructions to:
   determine, based on the second set of restrictions, that the second device is authorized to access the wireless network;
   determine that the second device is attempting to access a blocked website; and
   prevent the second device from accessing the blocked website.

5. The device of claim 1, wherein the first set of restrictions are associated with a plurality of devices, and wherein the at least one processor is further configured to execute the computer-executable instructions to:
   determine that the first set of restrictions have been modified to include an updated set of restrictions; and
   provide the updated set of restrictions to the plurality of devices.

6. The device of claim 1, wherein the at least one processor is further configured to execute the computer-executable instructions to:
   determine, at a first time, that the first device is attempting to access a restricted computer system on the wireless network;
   prohibit, at the first time, the first device from accessing the restricted computer system based at least in part on the first set of restrictions;
   generate modified restriction data based at least in part on the first set of restrictions, wherein the modified restriction data comprises a third set of restrictions that temporarily grant the first device access to the restricted computer system; and
   temporarily provide, at a second time after the first time, the first device access to the restricted computer system.

7. The device of claim 1, wherein the at least one processor is further configured to execute the computer-executable instructions to:
   receive an indication to temporarily override the first set of restrictions and the second set of restrictions; and
   pause access to the wireless network for both the first device and the second device.

8. The device of claim 1, wherein the first time window has a fixed daily schedule.

9. The device of claim 1, wherein the first set of restrictions are associated with a plurality of devices and comprise a network access duration restriction, a time of day access restriction, a predetermined data usage limit restriction, a bandwidth allocation restriction, a relative device priority restriction, an Internet access limit restriction, or a parental control restriction.

10. A method comprising:
   receiving, by a device, first data that identifies a first device;
   receiving second data that identifies a second device;
   determining, using the first data, a first set of restrictions associated with access to a wireless network by the first device;
   determining, using the second data, a second set of restrictions associated with access to the wireless network by the second device, wherein the second set of restrictions are different than the first set of restrictions;
   determining that the first device is attempting to access the wireless network outside a first time window that is permitted by the first set of restrictions; and preventing the first device from accessing the wireless network.

11. The method of claim 9, further comprising:
   determining that the second device is attempting to perform an action that is restricted by the second set of restrictions during a time window that is permitted by the second set of restrictions; and preventing the action from being performed.

12. The method of claim 10, wherein the device is an access point, and wherein the action is (1) sending data, or (ii) a request to access content data.

13. The method of claim 9, further comprising:
   determining, based on the second set of restrictions, that the second device is authorized to access the wireless network;

determining that the second device is attempting to access a blocked website; and preventing the second device from accessing the blocked website.

14. The method of claim 9, wherein the first set of restrictions are associated with a plurality of devices, the method further comprising:

determining that the first set of restrictions have been modified to include an updated set of restrictions; and providing the updated set of restrictions to the plurality of devices.

15. The method of claim 9, further comprising:

determining, at a first time, that the first device is attempting to access a restricted computer system on the wireless network;

prohibiting, at the first time, the first device from accessing the restricted computer system based at least in part on the first set of restrictions;

generating modified restriction data based at least in part on the first set of restrictions, wherein the modified restriction data comprises a third set of restrictions that temporarily grant the first device access to the restricted computer system; and temporarily providing, at a second time after the first time, the first device access to the restricted computer system.

16. The method of claim 9, further comprising:

receiving an indication to temporarily override the first set of restrictions and the second set of restrictions; and pausing access to the wireless network for both the first device and the second device.

17. The method of claim 9, wherein the first time window has a fixed daily schedule.

18. The method of claim 9, wherein the first set of restrictions are associated with a plurality of devices and comprise a network access duration restriction, a time of day access restriction, a predetermined data usage limit restriction, a bandwidth allocation restriction, a relative device priority restriction, an Internet access limit restriction, or a parental control restriction.

19. A method comprising:

determining, by an access point, first data that identifies a first device;

receiving second data that identifies a second device;

determining a first set of restrictions associated with access to a wireless network by the first device using the first data;

determining a second set of restrictions associated with access to the wireless network by the second device using the second data:

determining that the first device is attempting to access the wireless network at a time prohibited by the first set of restrictions; and generating a first alert.

20. The method of claim 18, further comprising:

preventing the first device from accessing the wireless network.

21. The method of claim 18, further comprising:

determining that the second device is accessing a blocked website; and generating a second alert.

* * * * *